(12) United States Patent
Ward

(10) Patent No.: US 8,977,656 B2
(45) Date of Patent: Mar. 10, 2015

(54) INLINE TREE DATA STRUCTURE FOR HIGH-SPEED SEARCHING AND FILTERING OF LARGE DATASETS

(75) Inventor: Roy W. Ward, Eugene, OR (US)

(73) Assignee: Moonshadow Mobile, Inc., Eugene, OR (US)

( * ) Notice: Subject to any disclaimer, the term of this patent is extended or adjusted under 35 U.S.C. 154(b) by 635 days.

(21) Appl. No.: 13/347,646

(22) Filed: Jan. 10, 2012

(65) Prior Publication Data
US 2012/0179699 A1    Jul. 12, 2012

Related U.S. Application Data

(60) Provisional application No. 61/431,423, filed on Jan. 10, 2011, provisional application No. 61/431,654, filed on Jan. 11, 2011.

(51) Int. Cl.
*G06F 17/30* (2006.01)
*G06F 17/22* (2006.01)

(52) U.S. Cl.
CPC ........ *G06F 17/2252* (2013.01); *G06F 17/2258* (2013.01); *G06F 17/30589* (2013.01)
USPC ............................. 707/811; 707/754; 707/797

(58) Field of Classification Search
CPC ............ G06F 17/2252; G06F 17/2258; G06F 17/30589
USPC .......................................... 707/754, 797, 811
See application file for complete search history.

(56) References Cited

U.S. PATENT DOCUMENTS

| | | | | |
|---|---|---|---|---|
| 5,276,868 A | * | 1/1994 | Poole ............................ | 707/693 |
| 5,710,915 A | * | 1/1998 | McElhiney ............................ | 1/1 |
| 5,721,899 A | * | 2/1998 | Namba ............................ | 1/1 |
| 5,737,732 A | * | 4/1998 | Gibson et al. ............................ | 1/1 |
| 5,829,004 A | * | 10/1998 | Au ............................ | 711/173 |
| 5,978,797 A | * | 11/1999 | Yianilos ............................ | 1/1 |
| 6,012,057 A | | 1/2000 | Mayer et al. | |
| 6,175,835 B1 | | 1/2001 | Shadmon | |
| 6,341,280 B1 | | 1/2002 | Glass | |
| 6,374,251 B1 | * | 4/2002 | Fayyad et al. ............................ | 1/1 |
| 6,499,033 B1 | * | 12/2002 | Vagnozzi ............................ | 1/1 |

(Continued)

OTHER PUBLICATIONS

Bagwell, Fast and Space Efficient Trie Searches, 2000.*

(Continued)

*Primary Examiner* — Neveen Abel Jalil
*Assistant Examiner* — Kristofer Biskeborn
(74) *Attorney, Agent, or Firm* — David S. Alavi

(57) ABSTRACT

A data structure comprises a clump header table and an inline tree data structure. The inline tree, representing filterable data fields of hierarchically organized data records, comprises an alternating sequence of first-level binary string segments, each followed by one or more corresponding second-level binary string segments. Each clump header record includes an indicator of a location in the inline tree of corresponding binary string segments. A dedicated, specifically adapted conversion program generates the clump header file and the inline tree for storage on any computer-readable medium, and the inline tree can be read entirely into RAM to be searched or filtered. A dedicated, specifically adapted search and filter program is employed to list or enumerate retrieved data records. Run-time computer code generation can reduce time required for searching and filtering. One example includes spatial searching and filtering of data records that include spatial coordinates as data fields.

31 Claims, 12 Drawing Sheets

(56) References Cited

U.S. PATENT DOCUMENTS

| | | | |
|---|---|---|---|
| 6,560,610 B1* | 5/2003 | Eatherton et al. .................... 1/1 |
| 6,581,058 B1* | 6/2003 | Fayyad et al. ................. 707/737 |
| 6,675,171 B2* | 1/2004 | Tikkanen et al. .................... 1/1 |
| 6,721,723 B1* | 4/2004 | Gibson et al. ......................... 1/1 |
| 6,728,732 B1 | 4/2004 | Eatherton et al. |
| 7,827,218 B1* | 11/2010 | Mittal ........................... 707/899 |
| 2001/0042186 A1* | 11/2001 | Iivonen et al. ................. 711/207 |
| 2002/0035660 A1* | 3/2002 | Tikkanen et al. .................. 711/1 |
| 2002/0087510 A1* | 7/2002 | Weinberg et al. .................. 707/1 |
| 2003/0018620 A1* | 1/2003 | Vishnubhotla .................... 707/3 |
| 2003/0061189 A1* | 3/2003 | Baskins et al. .................... 707/1 |
| 2003/0061227 A1* | 3/2003 | Baskins et al. ................. 707/101 |
| 2003/0105745 A1* | 6/2003 | Davidson et al. .................... 707/3 |
| 2004/0059725 A1 | 3/2004 | Sharangpani et al. |
| 2004/0107184 A1* | 6/2004 | Longshaw ......................... 707/3 |
| 2004/0111439 A1 | 6/2004 | Richardson et al. |
| 2004/0117396 A1* | 6/2004 | Avadhanam et al. ......... 707/101 |
| 2004/0133590 A1* | 7/2004 | Henderson et al. ............ 707/102 |
| 2004/0193619 A1* | 9/2004 | Venkatachary et al. ...... 707/100 |
| 2004/0205517 A1 | 10/2004 | Lampert et al. |
| 2004/0243576 A1* | 12/2004 | Shrivastava et al. .............. 707/5 |
| 2004/0267710 A1* | 12/2004 | Cotarmanac'h et al. .......... 707/3 |
| 2005/0027744 A1* | 2/2005 | Avadhanam et al. ...... 707/104.1 |
| 2005/0055351 A1* | 3/2005 | Barton et al. .................... 707/10 |
| 2005/0091223 A1 | 4/2005 | Shaw et al. |
| 2005/0171959 A1* | 8/2005 | Deforche et al. ............. 707/100 |
| 2005/0240604 A1* | 10/2005 | Corl et al. ..................... 707/100 |
| 2005/0251331 A1* | 11/2005 | Kreft ............................. 701/207 |
| 2006/0271540 A1* | 11/2006 | Williams ........................... 707/7 |
| 2006/0282457 A1* | 12/2006 | Williams ...................... 707/102 |
| 2006/0288024 A1* | 12/2006 | Braica ........................... 707/101 |
| 2007/0192548 A1* | 8/2007 | Williams ...................... 711/154 |
| 2008/0019317 A1 | 1/2008 | Vellanki et al. |
| 2008/0086464 A1 | 4/2008 | Enga |
| 2009/0077113 A1 | 3/2009 | Fidaali et al. |
| 2009/0138790 A1 | 5/2009 | Larcheveque et al. |
| 2010/0011125 A1 | 1/2010 | Yang et al. |
| 2010/0023515 A1* | 1/2010 | Marx ................................ 707/6 |
| 2010/0057792 A1* | 3/2010 | Ylonen ......................... 707/206 |
| 2010/0085223 A1 | 4/2010 | Hendrickson |
| 2010/0127902 A1* | 5/2010 | Schneider ....................... 341/51 |
| 2010/0146004 A1 | 6/2010 | Sim-Tang |
| 2010/0185609 A1 | 7/2010 | Wright et al. |
| 2010/0281082 A1* | 11/2010 | Ylonen ......................... 707/816 |
| 2010/0332561 A1 | 12/2010 | Prahlad et al. |
| 2011/0016153 A1* | 1/2011 | Atta et al. ..................... 707/797 |
| 2012/0005239 A1 | 1/2012 | Nevin |
| 2012/0016908 A1 | 1/2012 | Leung et al. |
| 2012/0179699 A1* | 7/2012 | Ward et al. .................... 707/754 |

OTHER PUBLICATIONS

Gabow, Harold N. Data structures for weighted matching and nearest common ancestors with linking. University of Colorado, Boulder, Department of Computer Science, 1990.*

Office action dated Mar. 25, 2013 in co-owned U.S. Appl. No. 13/326,326.

Acharya et al; Adaptive Algorithms for Cache-efficient Trie Search; ALENEX'99, LNCS 1619, pp. 296-311, Goodrich & McGeoch (Eds); Sringer-Verlag (1999).

U.S. Appl. No. 13/326,326, filed Dec. 15, 2011, Ward.

U.S. Appl. No. 13/733,890, filed Jan. 4, 2013, Ward.

U.S. Appl. No. 13/740,278, filed Jan. 14, 2013, Ward.

U.S. Appl. No. 13/743,613, filed Jan. 17, 2013, Ward.

U.S. Appl. No. 14/489,430, filed Sep. 17, 2014, Ward.

International Search Report and Written Opinion dated Aug. 27, 2012 in co-owned counterpart App No. PCT/US2012/020841.

Office action dated Oct. 23, 2013 in co-owned U.S. Appl. No. 13/326,326.

Office action dated Jun. 12, 2014 in co-owned U.S. Appl. No. 13/733,890.

Notice of Allowance dated Jul. 16, 2014 in co-owned U.S. Appl. No. 13/740,278.

Office action dated Sep. 12, 2014 in co-owned U.S. Appl. No. 13/743,613.

* cited by examiner

| string table | |
|---|---|
| ...000 | Smith |
| ...001 | Jones |
| ...010 | Doe |
| ...010 | John |
| ...011 | Mary |
| ...101 | Oak |
| ...110 | Main |
| ...111 | Elm |
| ...111 | Portland |
| ...000 | Eugene |
| ...001 | Corvallis |
| ... | ... |

FIG. 5A

| supplementary table | |
|---|---|
| ...001 | Street |
| ...010 | Boulevard |
| ...011 | Avenue |
| ...100 | Lane |
| ...101 | Road |
| ... | ... |

FIG. 5B

| clumpID | Portland | Multnomah | Oregon | Cong 1 | OR house 36 | OR senate 18 | 97201 | ... |
|---|---|---|---|---|---|---|---|---|

| clumpID | Eugene | Lane | Oregon | Cong 4 | OR house 8 | OR senate 4 | 97405 | ... |
|---|---|---|---|---|---|---|---|---|

| clumpID | Ashland | Jackson | Oregon | Cong 2 | OR house 5 | OR senate 3 | 97520 | ... |
|---|---|---|---|---|---|---|---|---|

FIG. 5C

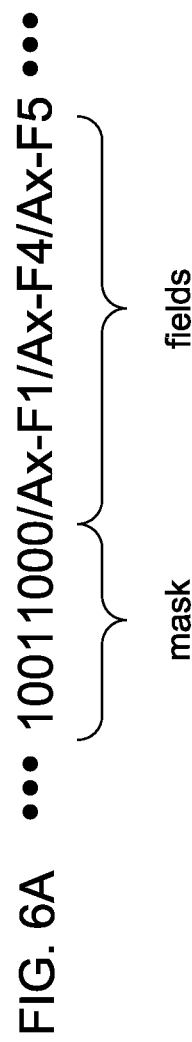
FIG. 6A ••• 10011000/Ax-F1/Ax-F4/Ax-F5 •••
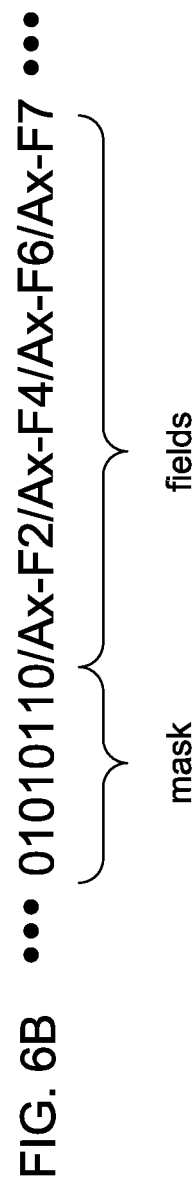
FIG. 6B ••• 01010110/Ax-F2/Ax-F4/Ax-F6/Ax-F7 •••

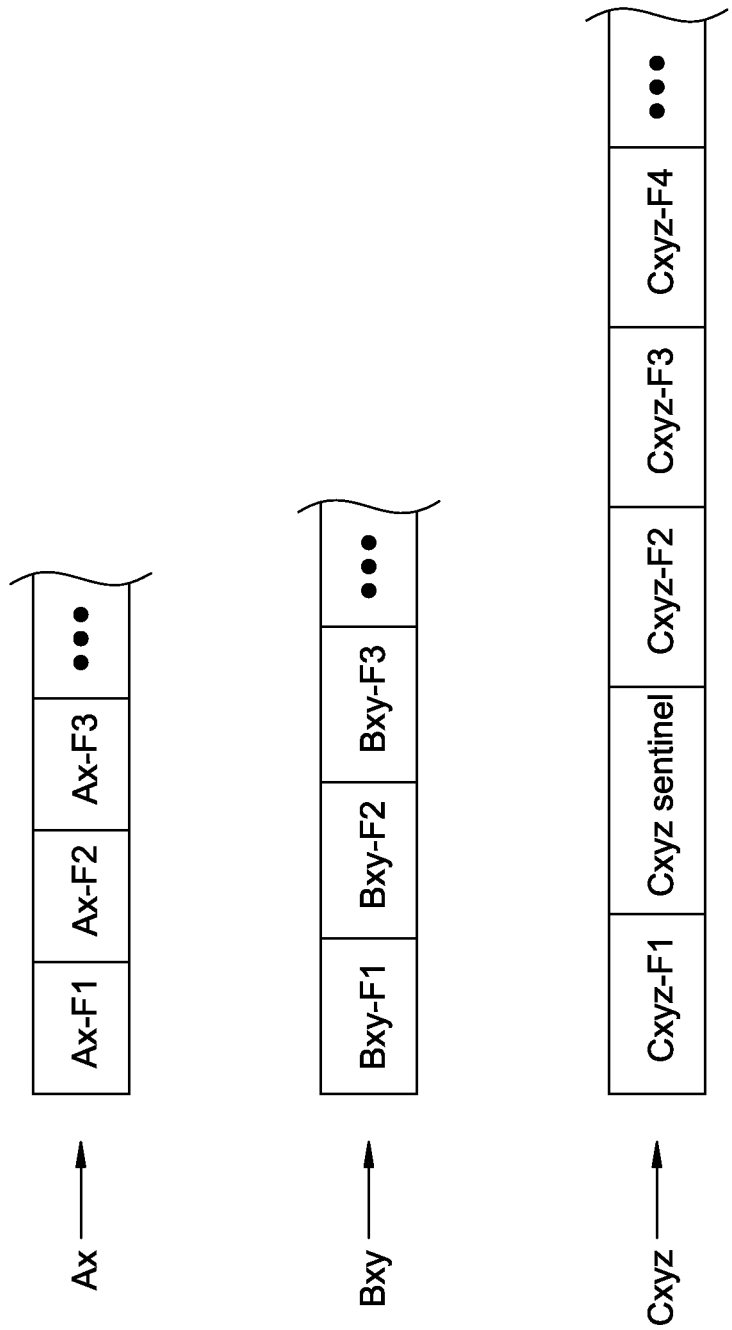

INLINE TREE DATA STRUCTURE FOR HIGH-SPEED SEARCHING AND FILTERING OF LARGE DATASETS

BENEFIT CLAIMS TO RELATED APPLICATIONS

This application claims benefit of (i) U.S. provisional App. No. 61/431,423 entitled "Systems and methods for high-speed searching and filtering of large datasets" filed Jan. 10, 2011 in the names of Roy. W. Ward and David S. Alavi and (ii) U.S. provisional App. No. 61/431,654 entitled "Systems and methods for high-speed searching and filtering of large datasets" filed Jan. 11, 2011 in the names of Roy. W. Ward and David S. Alavi, both of said provisional applications being hereby incorporated by reference as if fully set forth herein.

BACKGROUND

The field of the present invention relates to electronic data search and retrieval. In particular, systems and methods are disclosed herein for high-speed searching and filtering of large datasets.

The priority applications incorporated above differ slightly from one another. To the extent that there are any inconsistencies (e.g., differing terminology) between their respective disclosures, the disclosure of App. No. 61/431,423 shall be disregarded in favor of the disclosure of App. No. 61/431,654. Likewise, to the extent that there are any inconsistencies between the present disclosure and those of the priority applications, the disclosure of the priority applications shall be disregarded in favor of the present disclosure.

The subject matter disclosed or claimed herein may be related to subject matter disclosed or claimed in (i) U.S. provisional App. No. 61/424,063 entitled "Systems and methods for high-speed searching and filtering of large datasets" filed Dec. 17, 2010 in the name of Roy W. Ward and (ii) U.S. non-provisional application Ser. No. 13/326,326 entitled "Systems and methods for high-speed searching and filtering of large datasets" filed Dec. 15, 2011 in the name of Roy W. Ward. Both of those applications (hereinafter referred to collectively as "the '063 applications") are incorporated by reference as if fully set forth herein.

Many situations exist in which very large amounts of data are generated or collected (e.g., $10^4$, $10^6$, $10^8$, or more data records, each comprising multiple data fields). For data in a dataset to be of any practical use, indicia representing the dataset are stored according to a data structure arranged so that particular pieces of information can be located and retrieved from the dataset. In the pre-digital past, such data structures often comprised printed alphanumeric indicia on suitable media (often including an accompanying printed index), and data search and retrieval were manual functions performed by humans. The introduction of electronic data storage and search capabilities around the middle of the last century revolutionized the ability to store large datasets, and to search for and retrieve specific information from those stored datasets.

Today, alphanumeric indicia representative of a dataset are typically stored according to digital, electronic data structures such as an electronic spreadsheet or an electronic relational database. A spreadsheet (also referred to as a flat file database) can be thought of as a single table with rows and columns, with each row corresponding to a specific data record, and with each column corresponding to a specific data field of that data record. In a simple example (one that will be used repeatedly within the instant specification), each data record can correspond to a registered voter in a dataset of all registered voters in a particular state, e.g., Oregon. The data fields in each data record can include, e.g., last name, first name, middle name or initial, age, gender, marital status, race, ethnicity, religion, other demographic information, street address (likely divided into multiple data fields for street number, street name, and so on), city, state, zip code, party affiliation, voting history, county, U.S. house district, state senate or house district, school district, other administrative districts, and so on.

A relational database typically comprises multiple tables, each comprising multiple records with multiple fields, and relations defined among various fields in differing tables. In the registered voter example given above, a "voter" table might include voter records with name and demographic information in corresponding fields, and an "address" table might include address records that includes street address and district information in corresponding fields. A field in the voter table can include a pointer to the corresponding address in the address table, defining a one-to-many relationship between each address and one or more corresponding voters. Other tables and relationships can be defined (including many-to-many relationships and so-called pivot tables to define them).

Electronic spreadsheets and electronic relational databases have become standard methods for storing digital datasets. They offer nearly unlimited flexibility in arranging the data, for updating the data, for adding new data, and for sorting, searching, filtering, or retrieving data. However, it has been observed that for a very large dataset (e.g., $>10^6$ or more records, or even as few as $>10^4$ or $>10^5$ records), spreadsheets and databases tend to become unwieldy to store, access, and search. In particular, search and retrieval of information from such a large electronic dataset can become so slow as to render it essentially useless for certain data retrieval applications.

It would be desirable to provide systems and methods that enable high-speed search and retrieval of information from large electronic datasets that substantially exceed search and retrieval speeds from conventional electronic data structures (e.g., conventional spreadsheets and databases), so as to enable data search and retrieval applications that are too slow for practicable use with those conventional data structures.

SUMMARY

An inline tree data structure represents filterable data fields of hierarchically organized data records in a dataset, and comprises an alternating sequence of (i) multiple first-level binary string segments, each followed by (ii) a subset of one or more corresponding second-level binary string segments. The size of the inline tree data structure is reduced (i) by substituting binary string indices for alphanumeric strings in the data fields, (ii) excluding non-filterable data fields from the inline tree, and (iii) storing clumped data fields in a separate clump header table. Each clump data record in the clump header table includes an indicator of a location in the inline tree data structure of a corresponding first-level binary string segment. The resulting file size can be less than about 1-2 bytes per field per record (e.g., a dataset of one million records having 100 fields each can be stored in less than about 50 MB).

A dedicated, specifically adapted conversion program generates the inline tree data structure from data records in a more conventional database format. The inline tree data structure can be stored on any computer-readable medium, and is read entirely into RAM to be searched (with or without filtering on} one or more filter data fields). A dedicated, specifically adapted search and filter program is employed, which can list or enumerate the retrieved data records. The small size and contiguous arrangement of the inline tree data structure enables searching and filtering of $10^6$, $10^8$, or more data records (each including over 100 data fields) in less than about 150 nanoseconds per record per processor core. Runtime computer code generation can reduce time required for searching and filtering. One example includes searching and filtering of data records that include spatial coordinates (e.g., latitude and longitude) as data fields.

Objects and advantages pertaining to electronic data search and retrieval may become apparent upon referring to the exemplary embodiments illustrated in the drawings and disclosed in the following written description or appended claims.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 5A, 5B, and 5C illustrate schematically examples of tables that establish correspondence between binary data strings in the data structure of FIG. 4 and alphanumeric data strings in the dataset of FIG. 1.

FIGS. 6A and 6B illustrate schematically examples of binary data field masks incorporated into the data structure of FIG. 4.

FIG. 9 illustrates schematically detailed another exemplary arrangement of binary data strings in the inline tree data structure of FIG. 4.

The embodiments shown in the Figures are exemplary, and should not be construed as limiting the scope of the present disclosure or appended claims.

DETAILED DESCRIPTION OF EMBODIMENTS

In many examples of an electronic dataset, the data comprise a multitude of alphanumeric data records, and each one of those data records in turn comprises a corresponding alphanumeric data string in each of multiple data fields. In many instances, the dataset is hierarchical and can be organized according to a multilevel tree structure. Each node of such a tree structure typically represents a one-to-many relationship between (i) a single value (or perhaps a single subrange of values) in one or more data fields at one level of the tree and (ii) one or more values or subranges in one or more other data fields at the next level of the tree.

A dataset of all registered voters in the state of Oregon will be used repeatedly as an example in the present disclosure. The systems and methods disclosed or claimed herein are not, however, limited to that dataset or to datasets of that general type, but can be applied to any dataset in which the data can be arranged according to data structures exemplified herein. The Oregon registered voter dataset includes records for about $1.9 \times 10^6$ individual voters at about $1.0 \times 10^6$ distinct addresses. There are several dozen possible data fields for each voter and about 100 possible data fields for each address. A conventional spreadsheet or flat file database containing the Oregon registered voter dataset is about 2 GB (gigabytes) in size when stored on a computer hard disk.

Figure 1:
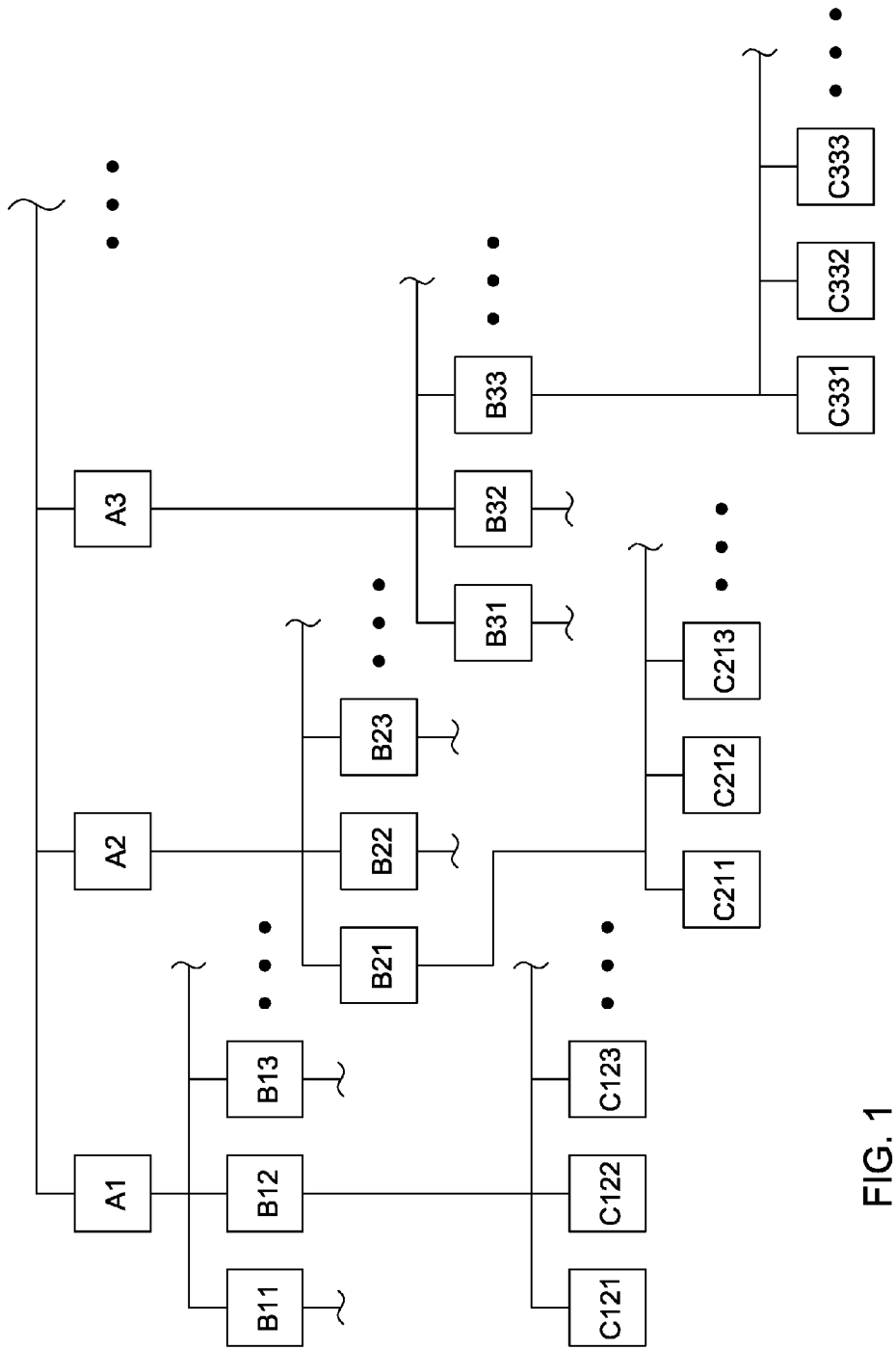
FIG. 1 illustrates schematically a hierarchical arrangement of a generic dataset.

FIG. 1 illustrates schematically an exemplary generic tree structure for organizing data into a three-level hierarchy (levels designated by A, B, and C in FIG. 1). One example of a data hierarchy for the registered voter example might comprise streets (A1, A2, A3, etc.), addresses (B11, B12, B13, etc. on street A1; B21, B22, B23, etc. on street A2; and so on for other addresses Bxy on other streets Ax), and voters (voters C111, C112, C113, etc. at address B11; voters C121, C122, C123, etc. at address B12; and so on for other voters Cxyz at other addresses Bxy). A terminal node of the tree structure (i.e., at the end of a branch; Cxyz in the example of FIG. 1, or a single voter in the voter dataset) can be referred to as a "leaf node" or simply a "leaf," and corresponds to an individual data record within the dataset. Each data record comprises data strings in corresponding data fields that designate the leaf node and its associated attributes, and can also include data strings in corresponding data fields that designate the higher level nodes to which the leaf node is connected (and attributes associated with those higher level nodes). A hierarchical data tree can include as many levels as needed or desired (which can vary by branch of the tree), and can include as many nodes as needed or desired at any given level. In a further example, the entire hierarchical data arrangement of FIG. 1 can itself constitute a terminal node or intermediate nodes of a larger tree structure (discussed further below). In addition to the registered voter example, other specific examples of data that can be advantageously organized according to hierarchical tree can include: census data, e.g., organized by state (A), county (B), tract (C), census block (D), and record (E); sales data, e.g., organized by customers (A), orders (B), and payments (C); or geopolitical data, e.g., organized by continents (A), countries (B), states or provinces (C), and cities (D). Those and any other suitable examples shall fall within the scope of the present disclosure or appended claims.

For convenience of description in the present specification and claims, stored electronic indicia and the underlying data they represent may be referred to interchangeably. It should be noted that the data themselves are an abstraction, and that the representative indicia are the objects that are electronically stored, handled, arranged in a data structure, searched, retrieved, or otherwise manipulated in the methods and systems disclosed or claimed herein. Use of the term "data" in the present disclosure shall be understood to indicate the representative indicia if appropriate in a given context.

One conventional electronic data structure that can be employed to store the data represented in FIG. 1 is an electronic spreadsheet in which electronic indicia representing the data are organized into rows and columns (i.e., a flat file database, with "rows" and "columns" defined in the usual way). Several rows of such a spreadsheet are illustrated schematically in FIG. 2. Each row of the spreadsheet corresponds to one data record of the dataset, hence to one of the "leaf nodes" of the tree of FIG. 1 (e.g., Cxyz). The columns of the spreadsheet correspond to data fields Cxyz-F1, Cxyz-F2, etc. for data record Cxyz, corresponding data fields Bxy-F1, Bxy-F2, etc. for node Bxy (the corresponding node at the next higher level in the hierarchy), and data fields Ax-F1, Ax-F2, etc. for node Ax (the corresponding node two levels higher in the hierarchy). Additional fields would be required for additional levels. Note that there is space reserved in the spreadsheet for every possible data field for every data record, regardless of whether a given data record has data in that field. Note also that data for the higher-level nodes are repeated in each data record that corresponds to a leaf node connected to that higher-level node.

Figure 2:
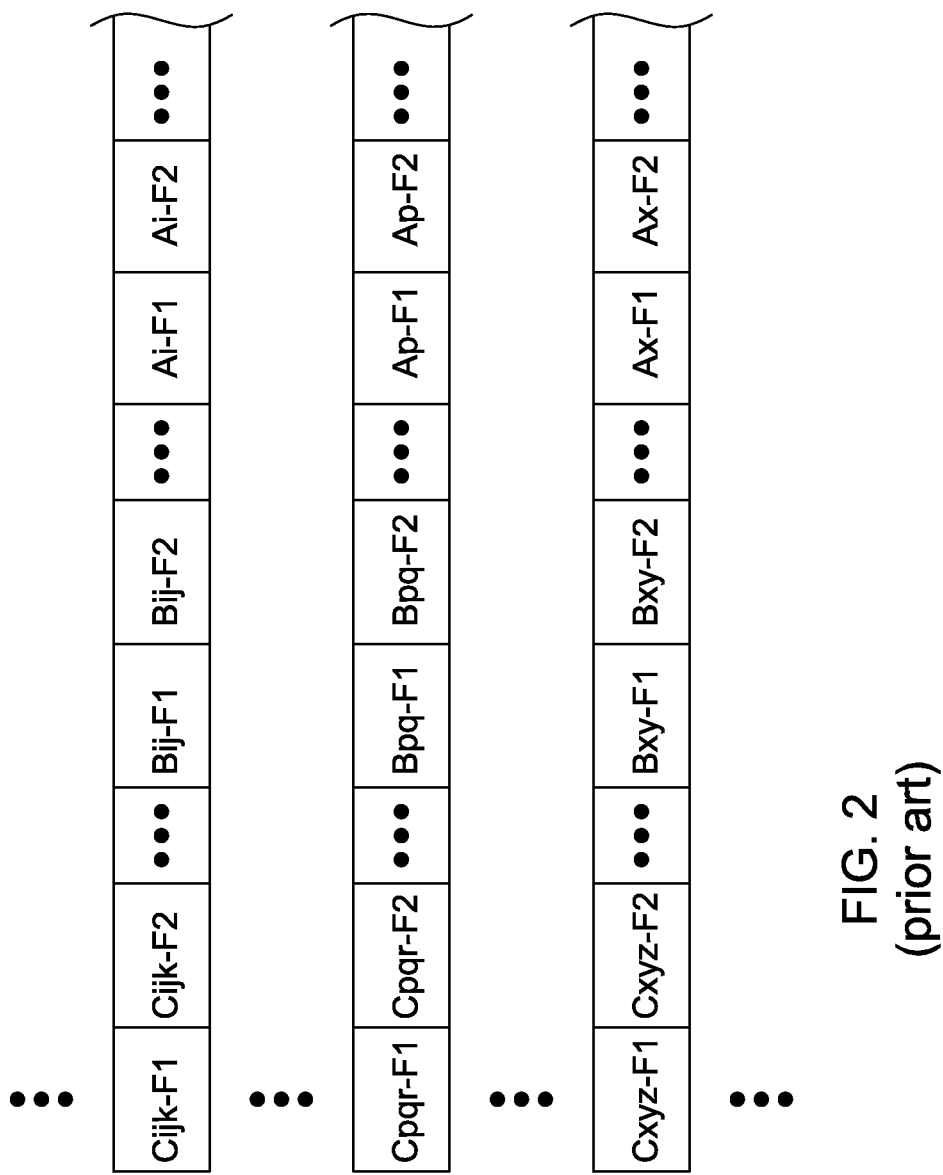
FIG. 2 illustrates schematically the arrangement of indicia corresponding to the dataset of FIG. 1 in an exemplary conventional flat file database.
Figure 3:
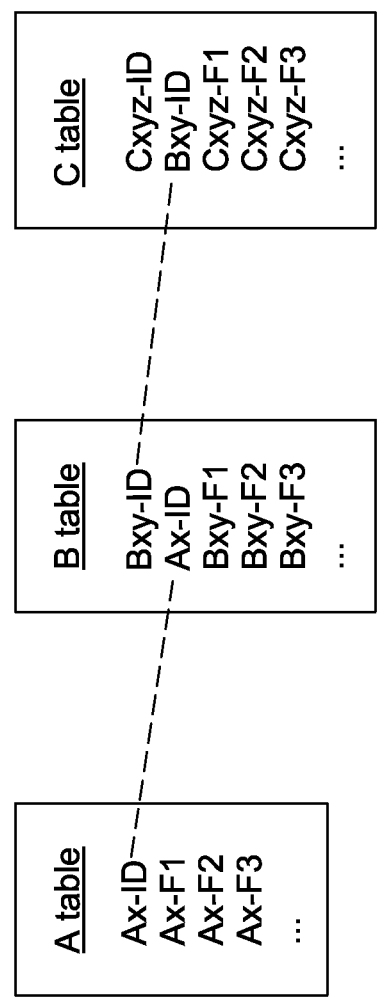
FIG. 3 illustrates schematically the arrangement of indicia corresponding to the dataset of FIG. 1 in an exemplary conventional relational database.

Another conventional electronic data structure that can be employed to store the data represented in FIG. 1 is an electronic relational database in which electronic indicia representing the data are organized into tables, as illustrated schematically in FIG. 3. Each table record in the "C" table represents a corresponding "leaf node" Cxyz and includes an identifier field Cxyz-ID, corresponding data fields Cxyz-F1, Cxyz-F2, etc., and a field for an identifier Bxy-ID of the corresponding node Bxy in the next higher level. Each table record in the "B" table represents a corresponding node Bxy and includes a field for the identifier Bxy-ID, corresponding data fields Bxy-F1, Bxy-F2, etc., and a field for an identifier Ax-ID of the corresponding node Ax in the next higher level. Each table record in the "A" table represents a corresponding node Ax and includes a field for the identifier Ax-ID and corresponding data fields Ax-F1, Ax-F2, etc. Each table diagram of FIG. 3 is understood to represent multiple different table records of the illustrated contents, as is understood by those skilled in database administration. The dotted lines connecting certain fields of different tables represent one-to-many relationships established within the relational database structure (e.g., one Ax to one or more Bxy's; one Bxy to one or more Cxyz's). Note that, as with the spreadsheet data structure of FIG. 2, space is reserved for every possible field for every data record. However, unlike the spreadsheet example of FIG. 1, data fields common to multiple data records need not be stored repeatedly for every leaf node. For example, the relationship between the Bxy-ID fields in the "B" and "C" tables enables storage of each of the Bxy-Fi fields only once, in the "B" table. The example of FIG. 3 is a relatively simple example of a relational database structure that includes only one-to-many relationships; more complicated examples might include more tables and many-to-many relationships that require so-called "pivot tables."

As noted above, conventional electronic data structures, e.g., spreadsheets and databases, offer great flexibility in terms of adding, removing, or modifying data records, establishing relationships between data fields in different records, and enabling a wide variety of sorts, searches, filters, or queries of the dataset. However, to provide such flexibility, the data structures become quite large and increasingly inefficient as the number of records in the dataset increases, partly due to the data required to define the data structure (i.e., "overhead") and partly due to space reserved for data fields that are empty. To boost speed, relational databases often include search indices, but those further increase the overall size of the data structure. The significant fraction of the impact of the large size of the data structure on the speed at which that structure can be sorted or searched arises from the manner in which large data structures are handled by the computer or server.

In typical use, only a portion of a large dataset can be loaded into the random-access memory (RAM) of a computer or server. A significant fraction of the time required to execute a sort or search of a large dataset is taken up by locating a needed segment of the dataset stored on a disk and pulling that segment into RAM and then into the processor's memory registers for processing, as opposed to the actual processing time once the data is in the processor registers. That sequence must be successively repeated until the entire dataset has been processed. Even worse, in many instances a given segment of the dataset is pulled into RAM more than once during each search operation. One reason for this lies in the way that data is typically handled by a computer processor. In typical conventional computer processors, data is retrieved into RAM or into a memory cache on the processor in fixed-size segments (e.g., 512 bytes or 4 kilobytes into RAM, or 64 bytes into the cache). To retrieve a particular data field during a search operation, for example, the processor retrieves such a segment of the data that includes the desired field, but that typically also contains other data fields that are not of interest at that time. However, in the course of the entire search operation, it is likely that those other fields will be needed. If so, then the same segment of the data must be retrieved again, perhaps multiple times, to eventually retrieve all of the data fields in that segment.

Figure 4:
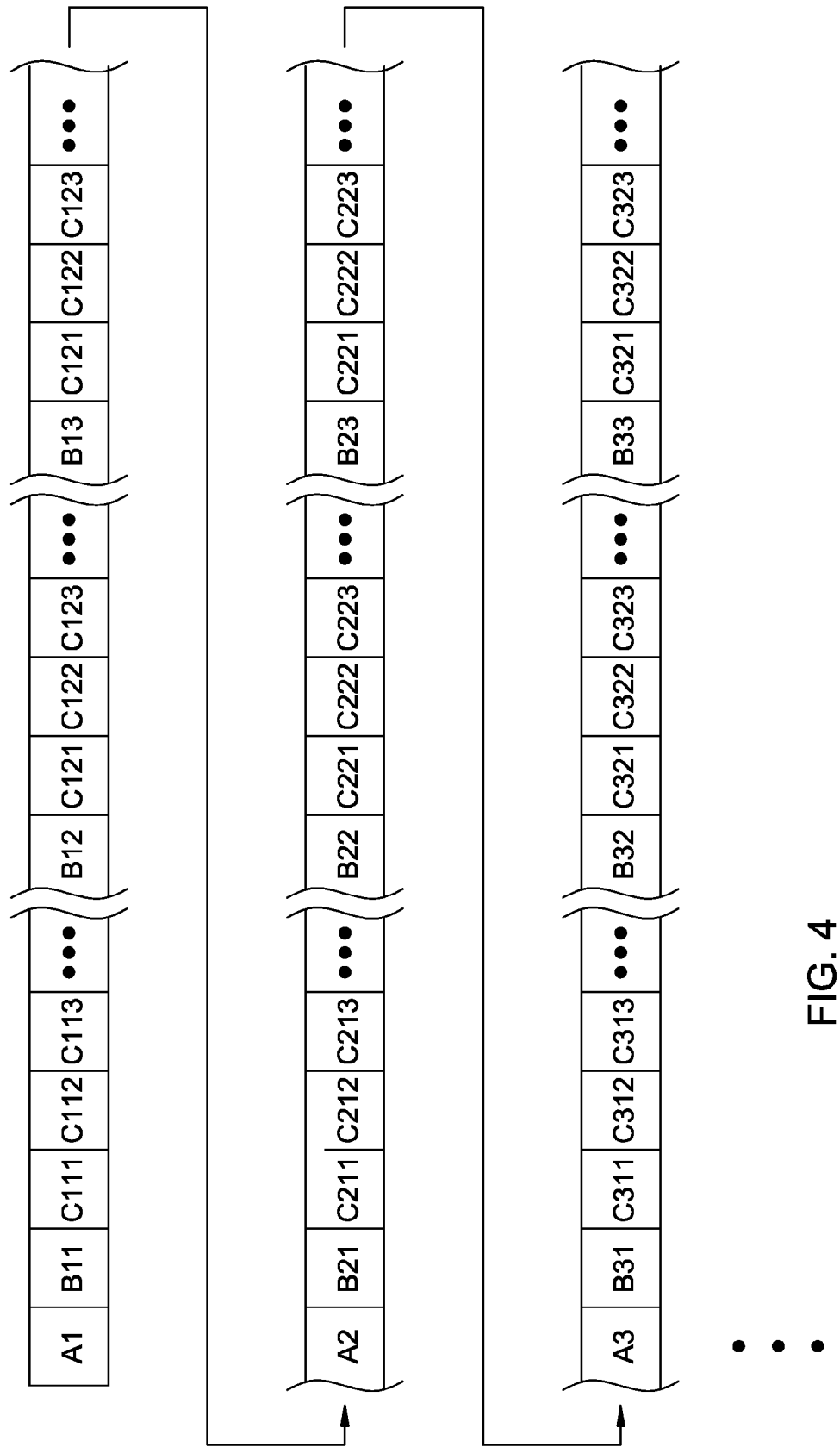
FIG. 4 illustrates schematically the arrangement of indicia corresponding to the dataset of FIG. 1 in an exemplary inline tree binary data structure according to the present disclosure.

To significantly speed up certain search, sort, or filter operations on a large dataset, alternative data structures have been developed; some examples of such alternative data structures are disclosed in the '063 applications (incorporated above), while other examples form a portion of the present disclosure. Such data structures can be illustrated schematically as shown in FIG. 4. As disclosed in the '063 applications, among the objectives of the data structure of FIG. 4 are (i) to enable dramatic reduction in the overall size of the stored data structure (among other reasons, to allow it to be stored in RAM in its entirety, even if it includes millions or tens of millions of records or more) and (ii) to reduce the number of times a given segment of the data is retrieved from RAM into the processor cache or registers (preferably reduced to a single such retrieval per data segment). For a dataset having a million records of 100 fields each, size reductions by factors of about 5 to 10 or more can be achieved and have been observed, relative to the same dataset in a conventional data structure. For simple search, sort, or filter operations on that dataset, speed enhancements by factors of about 5 to 100 or more can be achieved and have been observed, relative to similar operations performed on the same dataset in a conventional data structure.

A further objective of the data structure of FIG. 4, which falls within the scope of the present disclosure or appended claims, is to enable significant reduction of the number of decisions points that must be resolved by a computer processor in the course of a search, filter, or retrieval operation performed on the dataset. Some arrangements of binary indicia of the dataset, employed to reduce the size of the data structure stored according to the disclosure of the '063 applications, require the computer processor to make numerous decisions to correctly interpret the series of bytes that make up the stored binary indicia. In datasets encoded according to the present disclosure, size reductions are achieved in ways that require fewer decisions to be made by the computer processor, resulting in further speed gains over those disclosed in the '063 applications.

The data structure of FIG. 4 can be referred to as an "inline tree" data structure in which the branches and leaves of the tree of FIG. 1 are separated and arranged sequentially. There is no row/column arrangement as in a spreadsheet, nor is there any table arrangement as in a relational database. The data structure of FIG. 4 can be regarded as a single, continuous string of binary indicia representing a single line of characters or digits; a preferred format is a single string of binary digits, as will be explained further below. Within the binary indicia, binary fields represent the alphanumeric data fields in the underlying dataset in a way that reduces their size. Data fields are also arranged so as to increase the likelihood (i) that when one data segment is pulled into the processor cache for processing, the next segments to be processed have been pulled in along with it, and (ii) that all fields in that segment will be processed after it is first pulled into the processor cache, so that it does not need to be pulled into the processor cache again.

In the hierarchical data of FIG. 1, the data fields Ax-F1, Ax-F2, etc. can be referred to as first-level fields. Each node Ax can be defined by specifying, for each data field Ax-Fi, a subrange of data strings (equivalently, data values) that appear in that field in one or more data records. Note that a given subrange can comprise a single string, or a null string (i.e., no string stored in the field). Each node Ax therefore corresponds to a first-level subset of data records in the dataset, wherein the first-level subset includes only those data records for which the data string of each first-level data field Ax-Fi falls within the corresponding subrange. Similarly, each of the data fields Bxy-F1, Bxy-F2, etc. can be referred to as second-level fields. Each node Bxy can be defined by specifying, for each field Bxy-Fi, a subrange of data strings (equivalently, data values) that appear in that field in one or more data records (again, a given subrange can comprise a single string or a null string). Each node Bxy therefore corresponds to a second-level subset of data records within the corresponding first-level subset, wherein the second-level subset includes only those data records for which the data string of each second-level data field Bxy-Fi falls within the corresponding subrange. The foregoing description can be generalized to third-level data field(s) and data record subset(s), fourth-level data field(s) and data record subset(s), and so on.

The general arrangement of the inline tree data structure is illustrated schematically in FIG. 4. Each block in the diagram corresponds to a substantially contiguous binary string, each of which represents one or more data fields that in turn correspond to the branch nodes or leaf nodes of the underlying data (FIG. 1). For example, the binary strings labeled Ax (i.e., A1, A2, A3, etc.) include strings representing the values in the data fields Ax-F1, Ax-F2, Ax-F3, etc. for the corresponding first-level subsets of the data records. Similarly, the binary strings labeled Bxy include strings representing the values in the data fields Bxy-F1, Bxy-F2, etc., for the corresponding second-level subsets of the data records, and the binary strings labeled Cxyz include strings representing the values in the data fields Cxyz-F1, Cxyz-F2, etc. for each corresponding data record.

The binary strings Ax, Bxy, and Cxyz can be arranged in the inline tree so that each first-level subset of data records is represented by binary indicia that comprise a substantially contiguous first-level binary string segment, e.g., binary strings A1, B1$y$, and C1$yz$ together form a substantially contiguous first-level binary string segment that represents a corresponding first-level subset of data records, binary strings A2, B2$y$, and C2$yz$ together form another substantially contiguous first-level binary string segment that represents a different corresponding first-level subset of the data records, and so on. Each binary string Ax acts as a header for its corresponding substantially contiguous first-level binary string segment.

Within each first-level binary string segment (whether contiguous or not), the binary strings Bxy and Cxyz are arranged in the inline tree so that each second-level subset of data records is represented by binary indicia that comprise a substantially contiguous second-level binary string segment, e.g., binary strings B11 and C11$z$ together form a substantially contiguous second-level binary string segment that represents a corresponding second-level subset of data records, binary strings B23 and C23$z$ together form another substantially contiguous second-level binary string segment that represents a different corresponding second-level subset of the data records, and so on. Each binary string Bxy acts as a header for its corresponding substantially contiguous second-level binary string segment. The effect of the contiguous arrangement of the second-level binary string segments (and the first-level binary string segments, in some instances) is discussed further below.

Several techniques can be employed to drastically reduce the computer memory required to store the inline tree data structure of FIG. 4. As discussed further below, that size reduction leads to significantly faster search and filter operations on the dataset, as well as being desirable in its own right. However, some size reduction techniques require more decision-making than others by a computer processor executing a search, filter, or retrieval operation. Combining size reduction with decision reduction (according to the present disclosure) yields speed gains beyond those disclosed in the '063 applications.

A first technique for dataset size reduction includes substitution of a numerical index for each alphanumeric string stored in a data field (i.e., string indexing, sometimes referred to in computer science as string interning). The data in the fields Ax-Fi, Bxy-Fj, and Cxyz-Fk are conventionally represented by alphanumeric data strings, i.e., letters and numbers, and the data structures are arranged to store in each field any possible alphanumeric string up to a maximum permitted character length. If the maximum character length is, for example, 32 characters, then there are $36^{32} \approx 6 \times 10^{49}$ possible alphanumeric strings that can be stored in each field (e.g., using any letter or number but not symbols or punctuation marks). Each alphanumeric string stored in the conventional way (i.e., as numbers and letters requiring 1 byte per character plus overhead) would require at least 33 bytes of storage. In any practical circumstance, however, only a tiny fraction of those possible alphanumeric strings actually occur in the dataset. Recognizing that fact allows the size of the inline tree data structure to be substantially reduced relative to conventional spreadsheet or database structures.

Instead, to achieve significant size reduction, the dataset is analyzed and every unique alphanumeric string that actually occurs in the dataset is identified, enumerated, and stored (only once) in a master string table of any suitable type or format. An example is illustrated schematically in FIG. 5A, in which the enumeration is via a four-byte index (only the last three bits of each index are shown), enabling enumeration of up to $2^{32} \approx 4.3 \times 10^9$ different alphanumeric strings. Other index sizes can be employed, e.g., a three-byte index or a 19-bit index. In the registered voter example, strings might include every first, middle, or last name, every street name, every city, county, or state name, every party affiliation, every district name, and many dozens of other voter attributes. In an actual dataset of over $1.9 \times 10^6$ registered voters (each with several dozen possible attributes) and about $10^6$ addresses (each with about 100 possible attributes) in the state of Oregon, the master string table includes only about 300,000 unique entries (actually slightly less). In the inline tree structure, instead of storing binary indicia that represent alphanumeric strings in the conventional way (e.g., requiring one byte per character plus overhead, or at least 33 bytes per up-to-32-character string), the corresponding numerical index (four-byte, three-byte, 19-bit, or other desired size) is stored instead, which can reduce the space required for storing those fields, e.g., by about a factor of 8. Another advantage of using a string table is that an arbitrary upper limit on the size of the strings need not be imposed. Arbitrarily long strings can be included in the string table without affecting the size of the inline tree data structure.

The string index technique can be further exploited for certain data fields in which only a very limited set of unique alphanumeric strings occur. For example, there are only limited choices for the type of street that appears in a street name, e.g., Street, Boulevard, Avenue, Lane, Road, etc. That field can be replaced by a one-byte index in the inline tree data structure (allowing indexing of up to 256 such strings; only the last three bits are shown) and a corresponding supplementary string table (illustrated schematically in FIG. 5B; referred to as an auxiliary string table in the '063 applications and App. No. 61/431,654). Another example is party affiliation, which can also be replaced by a one byte index in the inline tree data structure (currently there are fewer than 256 recognized political parties) and a corresponding supplementary string table. Other examples include gender, marital status, street direction, and so on. Any suitable index size or combination of index sizes can be employed (e.g., one-byte, two-byte, three-byte, etc.; need not be restricted to a number of whole bytes, i.e., fractional bytes could be used).

Using a master string table and storing a binary index in the inline tree data structure, it is still possible to store any possible alphanumeric string (up to a specified maximum length). Storing the alphanumeric string only once (in the master string table) and storing the corresponding binary indices in the inline tree data structure results in substantial reduction of the size of resulting data structure. It should be noted that string indexing can be implemented to reduce the size of data structures other than the inline tree data structure of FIG. 4. In particular, string indexing can be employed (alone or in combination with other size-reducing techniques, including those disclosed herein) to reduce the size of an inline data structure that is not necessarily arranged according to a hierarchical tree organization scheme, or to reduce the size of a conventional flat file or relational database, or other data structure. String indexing is employed in the exemplary inline tree data structure of the '063 applications as well as in exemplary inline tree data structures arranged according to the present disclosure or appended claims.

A second technique for dataset size reduction exploits the overlap properties of various attributes in the dataset. In the registered voter example, there are numerous address-related attributes (about 100) that are geographically constrained. These include attributes such as congressional district, state house and senate districts, school, water, or other administrative districts, zip code, county, city, ward, precinct, and so on. Assuming 100 attributes and an average of 10 alternatives per attribute (a conservative estimate), then there are about $10^{100}$ possible combinations of those attributes. However, many of those combinations include mutually exclusive combinations, e.g., an address in a state senate district in the northeast corner of the state cannot also lie within in a school district in the southwest corner of the state, or an address in a county in the southeast corner of the state cannot also lie within a city in the northwest corner of the state. In a specific example, analysis of the registered voter dataset for Oregon reveals that only about 7000 unique combinations of about 100 address-related attributes actually occur among the roughly $10^6$ unique addresses in the dataset, which affords another opportunity for massively reducing the size of the inline tree data structure of FIG. 4. Each of those combinations shall be referred to herein as an "attribute clump," record clump," "data clump," or simply as a "clump." Note that a given clump might include a "null" entry for one or more of the clumped attributes.

Attribute clumping enables the substitution into the inline tree data structure (of the '063 applications) of a single clump index per address (e.g., two-byte, four-byte, or other suitable size) to replace alphanumeric strings (e.g., 33 bytes each) or four-byte indices (if the numerical string index technique described above has been implemented) in the nearly 100 data fields per address. A "clump table" can be employed to store the correspondence between the clump index (which can be referred to as a composite data string, because one data string takes the place of a combination of multiple data field values; the clump index can be any suitable size) and the specific alphanumeric strings associated with the fields of that clump (exemplary partial entries, i.e., clump data records) in such a clump table are illustrated schematically in FIG. 5C). The resulting overall size reduction of the data structure can be enormous (e.g., a reduction of over 3 GB out of about 3.5 GB for a dataset including 100 32-character alphanumeric fields for $10^6$ addresses, or a reduction of about 400 MB out of about 600 MB for a dataset including 100 4-byte-indexed fields, as described above, for $10^6$ addresses).

It should be noted that, in the registered voter example dataset, the "street" designations (i.e., the Ax nodes) do not typically correspond to entire physical streets. To facilitate compression of the data using clumping, each physical street can be divided into segments so that each segment falls within only a single geographic clump. When a "street" is referred to as a level in the hierarchical dataset, it is actually these street segments that are referred to. The clump index can be one of the fields Ax-Fi of each first-level binary string segment in an inline tree data structure according to the '063 applications.

The attribute clumping described above is not restricted to geographically constrained, address-related attributes. Any attributes of a given data record can be advantageously clumped in a similar manner, if there is a sufficiently high degree of correlation or anti-correlation between specific field values in the corresponding fields. For example, in a dataset pertaining to recorded music, certain artists are unlikely to perform in certain genres (e.g., unlikely to have "Philharmonic" and "heavy metal" in the same data record). In another example, in a dataset pertaining to sales, purchasers of certain products might be quite likely to purchase certain other products (e.g., purchasers of camping gear are likely to also purchase hiking boots).

A single clump encompassing all data records (i.e., no attributes clumped) results in no reduction in size of the data structure; one data record per clump (i.e., all attributes clumped) also results in no size reduction. Between those extremes, one or more optimum subsets of attributes can be found for minimizing the size of the stored data structure using clumping, and various suitable subsets of attributes can be employed for significantly reducing the size of the data structure. Use of such optimum or suitable subsets to reduce the size of the inline tree data structure by clumping shall fall within the scope of the present disclosure or appended claims. The choice of which attributes to clump together depends on the nature of the particular dataset, and the degree of correlation (or anti-correlation) between field values in the corresponding data fields. A certain amount of trial and error may be required for finding a suitable subset of attributes to clump to achieve a needed or desired reduction in the size of the data structure. It is typically but not necessarily the case that clumping is most advantageous when it includes only attributes specific to only the first-level subsets of the data records in a hierarchical dataset (e.g., only address-specific fields in the registered voter example, or only the fields Ax-Fi in the generic example of FIG. 4). It should be noted that attribute clumping can be implemented to reduce the size of data structures other than the inline tree data structure of FIG. 4. In particular, attribute clumping can be employed (alone or in combination with other size-reducing techniques, including those disclosed herein) to reduce the size of an inline data structure that is not necessarily arranged according to a hierarchical tree organization scheme, or to reduce the size of a conventional flat file or relational database, or other data structure. Attribute clumping is employed in the exemplary inline tree data structure of the '063 applications as well as in exemplary inline tree data structures arranged according to the present disclosure or appended claims.

A third technique for dataset size reduction includes the use of so-called field masks to eliminate the need for space in the data structure for fields that contain no data. The field mask technique is employed in inline tree data structures arranged according to the '063 applications, but is not employed in inline tree data structures arranged according to the present disclosure, for reasons discussed below. For fields that have not been clumped, the corresponding attributes must be stored in the inline tree data structure (as a one-, two-, or four-byte index, for example, as described above). However, not every data record has a specific value stored in every possible field, i.e., some data fields are "nulled." In conventional data structures such as those illustrated in FIGS. 2 and 3, those nulled data fields take up space as if they were filled. In the inline tree structure of FIG. 4, each binary string Ax, Bxy, and Cxyz includes a field mask near its beginning that specifies which fields are occupied. Each of the binary strings Ax, Bxy, and Cxyz in the inline tree data structure can include a field mask for its corresponding fields Ax-Fi, Bxy-Fi, and Cxyz-Fi, respectively. Examples are illustrated schematically in FIGS. 6A and 6B, in which a one-byte field mask is used to indicate the presence or absence of data in each of eight data fields Ax-F1 . . . Ax-F8.

In FIG. 6A, the one-byte field mask comprises the binary string 10011000, and is followed by values Ax-F1, Ax-F4, and Ax-F5 (in the form of one-, two-, or four-byte indices as described above, for example; a similar field mask could be employed for alphanumeric strings instead). Having 1's in the $1^{st}$, $4^{th}$ and $5^{th}$ bits of the masks and 0's in the others indicates that the succeeding data values are for the $1^{st}$, $4^{th}$, and $5^{th}$ data fields, respectively. No space is required to save null fields for the $2^{nd}$, $3^{rd}$, $6^{th}$ or $7^{th}$ fields. Instead, the five "0" bits in the mask are stored, which occupy negligible space compared to the 20 bytes potentially required to store the corresponding null fields. Similarly, in FIG. 6B the one-byte field mask comprises the binary string 01010110 followed by values (indices) for Ax-F2, Ax-F4, Ax-F6, and Ax-F7. The only space required for Ax-F1, Ax-F3, Ax-F5, and Ax-F8 are the four 0 bits in the field mask, indicating no data is stored for those fields. The size of the field mask is preferably made large enough to accommodate all data fields in a given binary string that might not contain data. It should be noted that field masking can be implemented to reduce the size of data structures other than the inline tree data structure of FIG. 4. In particular, field masking can be employed (alone or in combination with other size-reducing techniques, including those disclosed herein) to reduce the size of an inline data structure that is not necessarily arranged according to a hierarchical tree organization scheme, or to reduce the size of a conventional flat file or relational database, or other data structure.

Figure 7:
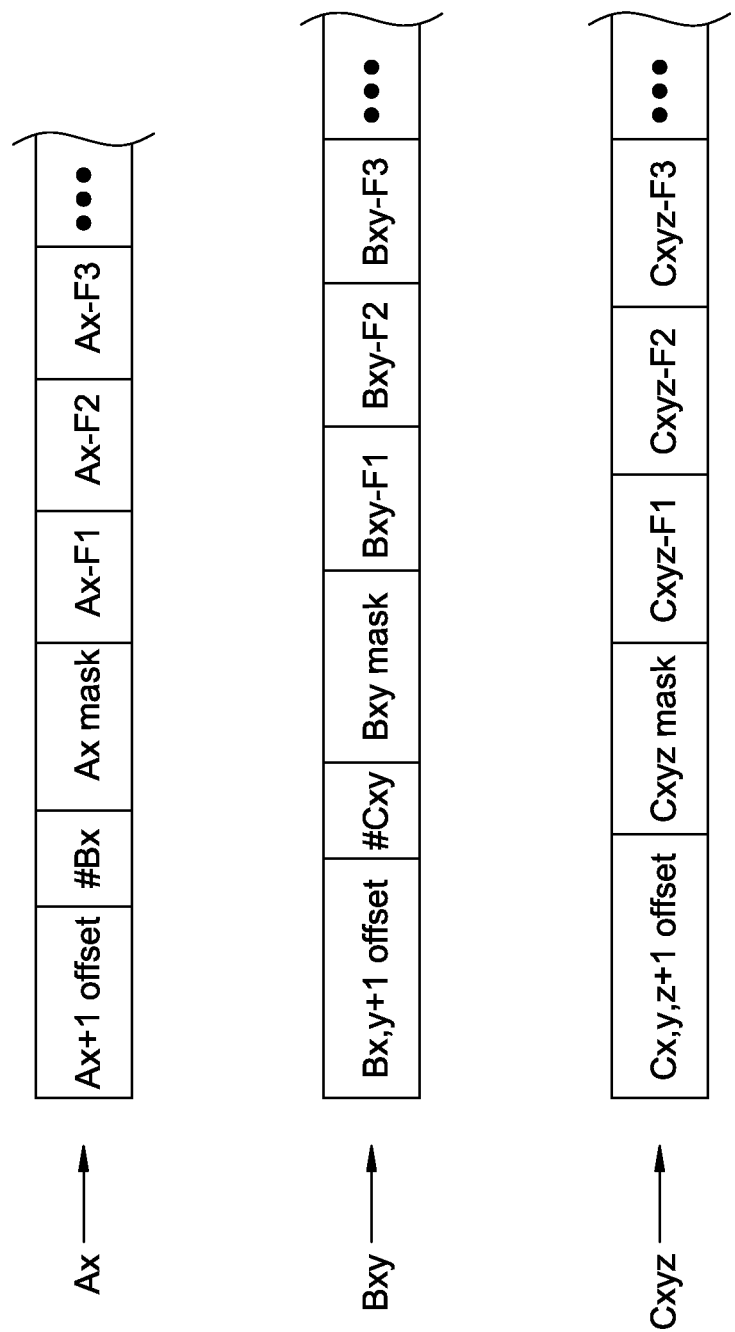
FIG. 7 illustrates schematically detailed exemplary arrangements of binary data strings in the inline tree data structure of FIG. 4.

FIG. 7 illustrates schematically details of exemplary binary strings Ax, Bxy, and Cxyz of an inline tree data structure arranged according to the '063 applications. In each example, the binary string begins with an indicator of the location in the inline tree data structure of the next string, e.g., an indicator of the location and Ax+1 occurs at the beginning of the Ax binary string, an indicator of the location of Bx,y+1 occurs at the beginning of the binary string Bxy, and an indicator of the location of Cx,y,z+1 occur at the beginning of the string Cxyz. Those indicators typically take the form of a relative offset (from the current location) or an absolute offset (from the beginning of the inline tree data structure). The offset indicators allow the binary strings to assume some characteristics of a linked list, in that each binary string has within it an indicator directing a search program to the next analogous binary string in the data structure to be processed. Note that certain strings may instead include (i) an indicator of the location in the inline tree data structure of a string of a different type (e.g., and indicator in the string Bxy of the position of the string Ax+1), (ii) an indicator that it is the last string in the list, or (iii) another type of indicator. Location indicators in the binary header portions speed up the searching by allowing entire string segments to be skipped, e.g., if the clump index does not match the filter criteria, then the other data fields within that clump need not be searched or filtered. Such location indicators are needed due to the use of field masks, which results in differing overall lengths of the strings Ax, Bxy, or Cxyz depending on how many fields contain data or not in a given data record.

Next in each exemplary binary string of FIG. 7 is an indicator of the number of nodes in the next level, e.g., each Ax binary string can include binary digits #Bx indicating the number of B-level nodes correspond to the node Ax (i.e., how many second-level binary string segment are contained within that first-level binary string segment), and each Bxy binary string similarly can include binary digits #Cxy indicating the number of C-level nodes in the next level. Next in each binary string is a field mask, described above, followed by strings representing data in those fields that are indicated by the field mask as containing data. A field for a clump index is included in the appropriate binary strings if data clumping has been employed. Recall that the data strings are not the literal alphanumeric strings, but instead are one-, two-, or four-byte indices (or other suitable binary indices) that correspond to alphanumeric strings according to FIGS. 5A-5C.

The inline tree data structure of FIG. 4 (whether arranged according to the '063 applications or according to the present disclosure or appended claims) differs profoundly from the conventional data structures of FIGS. 2 and 3 in several important ways. The use of string indexing and clumping, and field masks (if present), allow for significant reduction of the size of the stored data structure. Implementing all three techniques can cut the size by a factor of 10 or more. For example, the Oregon registered voter data set (about $1.6 \times 10^6$ voters with up to about 25 attributes each at about $10^6$ addresses with up to about 100 attributes each) can be stored in an inline tree data structure in about 160 MB if arranged as in FIG. 7. A flat file database storing the same data is about 1.5 GB, and a relational database storing that data is about 3 GB (varying depending on the number of different search indices set). Another reason for the size reduction is the substantial lack of so-called "overhead," e.g., in a binary file in which the inline tree data structure is stored. In a conventional flat file or relational database, at least one overhead byte is required for each alphanumeric string that is stored. In addition, additional storage is required to store the underlying table structure and relations of a relational database, even before fields of those tables are populated. In contrast, the inline tree data structure is just a string of bytes that are not recognizable as a dataset until "decoded" by a search program specifically tailored to the inline tree data structure. Note that a similarly tailored "conversion" program is required to generate the inline tree data structure.

One reason the size reduction is significant is that it enables the entire dataset to be loaded into RAM on a computer or server having reduced memory requirements. The entire 160 MB inline tree data structure can be readily loaded into a computer or server with an relatively ordinary 4 to 8 GB of RAM without significantly burdening the system, whereas the conventional flat file or relational database version of the dataset would severely tax such a system (if it could be loaded at all—a 3 GB database loaded into a 4 GB machine would leave scant resources for the operating system and other vital computer functions). On the other hand, the comparatively small size of the inline tree data structure can enable much larger datasets (e.g., $10^8$ voters) to be loaded entirely into RAM in high-end machines having 32 or 64 GB of RAM, wherein the equivalent conventional flat file or relational database simply could not be loaded entirely into RAM on any currently practicable computer or server. Even as hardware capabilities increase, the inline tree data structure will always enable use of a less powerful, less expensive machine to search a dataset of a given size, or searching of a larger dataset, or more and faster searches of a given dataset, using a machine of a given memory size and processor speed.

The size reduction of the data structure is desirable in its own right, as it enables datasets of a given size to be handled by smaller, less powerful computing devices, enables computing devices of given size and power to handle larger datasets, enables faster loading or rebooting of the dataset, or reduces time or cost associated with transmitting, reading, writing, or storing the dataset. Those benefits of size reduction can be realized to varying degrees by applying one or more of the techniques disclosed herein to any suitable data structure, including the inline tree data structure disclosed herein, an inline data structure that is not necessarily arranged according to a hierarchical tree organization scheme, a conventional flat file or relational database, or other data structure. Using the techniques disclosed herein in combination, the reduced data structure size typically can be less than about 5 bytes per field per record or less than about 3 bytes per field per record, often less than about 2 bytes per field per record (e.g., a dataset of one million records having 100 fields each can be stored in less than about 200 MB), or sometimes less than about 1 byte per field per record (e.g., a dataset of one million records having 100 fields each can be stored in less than about 100 MB). Contrast those sizes with 20 to 40 bytes per field per record typically required for conventional data structures.

The profoundly reduced size of the inline tree data structure does not come without a cost, however. Flat file and relational databases excel in their flexibility, enabling ready addition, deletion, or modification of data records in the dataset, often in real time while the database is "live." A wide variety of search, sort, filter, and retrieval functions can be readily implemented, adapted, or modified, for example using standardized Structured Query Language (SQL). However, as already discussed above, such conventional data structures quickly become impractically slow when they contain large numbers of individual data records. "Large" can mean $10^6$ records or more in some instances, or may mean as few as $10^5$ data records or even only $10^4$ data records in other instances.

The inline tree data structure, on the other hand, cannot be readily modified; if the underlying dataset changes, the inline tree data structure typically must be generated anew by the dedicated conversion program (a relatively slow process). A separate "update" or "override" file or table can be appended to or used with the inline tree data structure, but significantly degrades search and filter speed as it accumulates data records and is therefore not an optimal solution. The inline tree data structure is specifically arranged and optimized to perform a basic task—extremely rapid, filtered search of the data records in a large dataset, for listing or (more typically) enumeration. Particular data records cannot be randomly accessed or addressed within the inline tree data structure, nor can SQL be used to formulate queries. However, the inline tree data structure can be traversed by a customized search program extremely rapidly, during which a running list or count is kept of those data records matching one or more specified filter criteria. The intermixing of differing data field types within a single inline structure (e.g., the Ax-Fi, Bxy-Fi, and Cxyz-Fi fields all in the same inline structure) is quite unusual and counterintuitive to most database engineers, but that intermixing in part enables the high-speed filtering of the large dataset. That search program is specifically tailored and adapted to the specific arrangement of the inline tree data structure, as is described further below, and the speed of the search is facilitated by the specific arrangement of the binary strings that represent the data records. The available filtering is dictated in part by the clumping and indexing, and field masking (if present), described above. Differing searches or differing filtering capabilities can require (i) a different inline tree data structure to be generated (using a different, dedicated conversion program) from the same underlying data records and (ii) a different, dedicated search program to be employed. Once generated, the inline tree data structure cannot be readily modified or added to. If the underlying data records are modified or updated, an entirely new inline tree data structure is typically generated to incorporate those changes.

Another novel feature of the inline tree data structure is that, as a simple sequence of binary indicia (i.e., bytes), a binary file containing the inline tree data structure stored on a hard disk quite closely resembles the copy of that inline tree data structure that is read into RAM. That close correspondence has the desirable effect that little if any processing of the file is required when it is first loaded into RAM in preparation for searching. Consequently, the inline tree loads into RAM very quickly (e.g., less than 2 seconds to load the dataset for 1.9 million registered voters). Contrast that with the commonplace experience of waiting several (or many) seconds for, e.g., an ordinary word processor file to load when it is opened; that file's form when stored on disk differs substantially from its form in RAM, and significant processing (and therefore time) is required to achieve the conversion between the two. That processing is substantially eliminated for the inline tree data structure. Once the entire inline tree data structure is loaded into RAM, it continues to reside there as long as the user desires to perform searches of the dataset. Fast loading into RAM can be important, however, in a public server-based system in which reliability is important. Rapid loading into RAM can enable fast reboot of the system in the event of an error or crash. Redundant servers can be employed to enhance reliability, or to enable serial updating of the inline tree data structure without making the dataset unavailable during reprocessing of the updated dataset from its original data structure.

An important objective of the size reduction enabled by the inline tree data structure is to increase search speed. By making the data structure fit entirely into RAM, time consuming seek and retrieval from a hard disk is eliminated. But that is only a first step in accelerating the search speed. As data is used in a computer, the processor's L1 and L2 memory caches are scanned for the next needed data. If the needed data are present there, they are retrieved from there into the registers and processed (processing means searching in the context of the present disclosure). If not, then the necessary data are retrieved from RAM into the registers and caches.

In typical interactions between a computer processor and the computer's RAM and disk storage, data is typically retrieved in uniformly sized portions, which get smaller as the data moves from disk to RAM to the registers. Retrieval speeds also increase substantially as the data moves from disk to RAM to the registers. For example, data typically can be read from the disk into RAM in 512 byte portions, with an access time on the order of 10 milliseconds per read. That data is divided into multiple 64 byte portions that are stored in the processor's L2 cache, and into multiple 16 to 64 byte portions that are stored in the processor's L1 cache. Those portions align with conventional partitioning of the RAM into uniformly sized segments (e.g., 64-byte alignment of the data in RAM). Data in RAM can be read into L2 cache, L1 cache, and a register with about a 20-50 nanosecond read time; data in the L2 cache can be read into L1 cache and a register with about a 5-10 nanosecond read time; data from the L1 cache can be read into a register with about a 1-2 nanosecond read time.

By virtue of the substantially contiguous, sequential arrangement of the second-level binary string segments (and the first-level binary string segments in some instances), each 64-byte segment read from RAM typically needs to be accessed from RAM only once during any given search, because after it is read into the processor L1 or L2 cache, it remains there until it is processed in its entirety. Once that has occurred, that particular 64-byte portion need not be read from RAM again during that search. Due to the sequential arrangement of the data in the inline tree data structure, slow reads (i.e., from RAM) need only occur relatively infrequently. Each such read brings the next contiguous 64-byte portion of the data into the processor, which is in turn processed substantially in its entirety. The majority of individual reads into the processor registers are from the processor caches, and those reads are significantly faster than reading from RAM. Each 64-byte portion read into cache memory is completely processed before the next 64-byte portion is read. Because of the small size of the inline tree, each such read into cache memory enables processing of at least 16 data fields (for fields represented by four-byte indices) or over 100 data fields (when a clump index is read in the voter example).

Contrast this to typical processing of a conventional data structure. The use of alphanumeric data strings limits to about two the number of data fields processed per read from cache memory. Because there is no intentional sequential arrangement of the bytes read from RAM, it is quite likely that for any given read of 512 bytes only a fraction are relevant to the data fields being processed at that moment. For example, reading multiple attributes for a given voter record typically requires reads from multiple different tables in a relational database, which virtually guarantees that the needed data strings will have to read separately from the hard disk; each of those reads likely includes data from those tables relevant to other voters that are not needed immediately (if at all). The remaining bytes are not used immediately and are eventually written over. However, at some later time during the search process, those unused bytes will be needed and read from RAM again, along with surrounding bytes that, again, might not be needed (and may be needed later, or may already have been processed after an earlier read). Not only is the conventional data structure larger (and therefore inherently slower to read and process), but the reading process also includes significant fractions of useless or redundant reads. Such inefficiencies can be negligible when processing a few hundred or a few thousand records, but their cumulative effect becomes readily apparent when attempting to process $10^4$, $10^6$, $10^8$, or even larger numbers of records.

As an example of the speed achievable, an inline tree data structure arranged according to the '063 applications that represents the example voter database (about $1.9 \times 10^6$ voter records with about 25 data fields per voter located among about $10^6$ addresses with about 100 data fields per address) can be searched and filtered at a rate of about 250-400 nanosecond per voter record per processor core on a conventional server using a processor running at a standard clock speed (e.g., about 2-3 GHz; usually less than about 4 GHz). That speed is sufficient for the search to appear to a user to occur nearly in real time. A particular filter or set of filters can be selected (e.g., female Democrats aged 40-59 in the $4^{th}$ Congressional district of Oregon) and the total number of voters meeting those criteria (about 35,000 out of about 1.9 million) appears in a fraction of a second. That search and filter speed is about 100 times faster than those achievable with the same data in a conventional relational database (e.g., meaning that the voter number that appeared in a fraction of a second using the inline tree data structure would take a minute or more to update using the conventional relational database). Even with extreme optimization efforts by an experienced database administrator that would be problematic to employ in a typical deployment environment (e.g., consolidation of the relational database into a single flat table, reallocation of computing resources to give the search program unconditional priority over all other computer processes), searching and filtering the conventional data structure thus optimized is still about ten times slower than searching and filtering the inline tree data structure. Search and filter speeds generally achievable using the inline tree data structure with 100 fields per record (using a processor running at a conventional clock speed) can typically be less than about 500 nanoseconds per record per processor core (e.g., a dataset of one million records having 100 fields each can be searched and filtered in less than about 0.5 seconds with a single-core processor running at a standard clock speed), often less than about 400 nanoseconds per record per processor core, or sometimes less than about 300 nanoseconds per record per processor core. Contrast those speeds with 2000 to 5000 nanoseconds per record per core for the extremely optimized conventional database described above, and even slower speeds for conventional data structures that have not had expert optimization or do not have unconditional priority over other computer processes.

A customized binary file generation process is needed to convert a dataset from a conventional data structure (e.g., flat file or relational database) into an inline tree data structure. In contrast to the high-speed search program, the conversion program is typically quite slow, taking on the order of 10 minutes to process $10^6$ data records. However, that conversion process is performed only infrequently (e.g., to update the data) compared to the frequency of the search and filter process (e.g., many times per minute if data is being visualized and manipulated on a map, as described below). A suitable conversion process typically is embodied as a computer program operating on one or more computers, computer systems, or servers, which include one or more processors and include or are otherwise operatively coupled to one or more computer-readable media of any suitable type. Any suitable hardware or hardware-plus-software implementation can be employed for performing the conversion process, which includes: (i) receiving from a first computer-readable storage medium the dataset comprising electronic indicia of a multitude of alphanumeric data records arranged according to a conventional data structure; and (ii) using one or more computer processors programmed therefor and operatively coupled to the first storage medium, generating and storing electronic indicia of the dataset on a second computer-readable storage medium operatively coupled to the one or more computer processors, wherein the generated electronic indicia include an inline tree data structure as described above.

The generated and stored data structure can also include a string table, any needed or desired supplementary tables, or a clump table as described above, and the generation process can include, inter alia, analyzing the original dataset and extracting a list of all occurring strings, assigning indices to the strings, writing indicia of the strings and the corresponding indices in the string or supplementary tables, analyzing the data fields to determine combinations of data fields suitable for clumping, identifying the clumps that occur in the dataset, assigning clump indices, or writing indicia of the clumps and the corresponding indices into a clump table (e.g., in a clump header file). It should be noted that the string table, clump table, or supplementary table are used primarily during the dataset conversion process, for translating requested search filters prior to a search, or for providing a list of retrieved data records (e.g., actual names and addresses of voters meeting the filter criteria). Those ancillary tables typically are not needed or accessed during the actual search process; the clump header table and the inline tree structure are interrogated during search and filter processes.

For example, in the voter example, a user request to count (i) male (ii) Republicans (iii) age 45-59 (iv) in Lane County, Oreg. might be translated into a search performed by a dedicated search program that counts instances of (i) Cxyz-F4=1, (ii) Cxyz-F8=2, (iii) Cxyz-F5=4, and (iv) clump index=2134 through 2857. Generating a list of those voters might include translating (i) Cxyz-F1=0011 . . . 001 (4-byte), (ii) Cxyz-F2=1101 . . . 110 (4-byte), (iii) Bxy-F1=1110 . . . 000 (4-byte), (iv) Bxy-F2=10101101 (1-byte), (v) Bxy-F3=0001 . . . 011 (4-byte), (vi) Bxy-F4=00011011 (1-byte), and (vii) clump index=2390 into (ii) John (i) Doe, (iii) 1250 (iv) East (v) 17th (vi) Avenue, (vii) Eugene Oreg. 97403. Those field numbers, alphanumeric strings, and binary strings are merely one possible example. Myriad examples of searches employing various combinations of filter criteria can be employed within the scope of the present disclosure or appended claims. Any suitable assignment or allocation of field numbers or strings can be employed within the scope of the present disclosure or appended claims.

A suitable search or filtering process typically is embodied as a computer program operating on one or more computers, computer systems, or servers, which include one or more processors and include or are otherwise operatively coupled to one or more computer-readable media of any suitable type. The computers, systems, or servers that perform the search or filtering functions need not be, and often are not, the same as those that performed the data conversion process. In both cases (convert and search/filter), the computer, server, or system can be a stand-alone machine or can comprise one or machines connected by a local- or wide-area network (LAN or WAN) or the Internet. Any suitable hardware or hardware-plus-software implementation can be employed for searching or filtering, which includes: (a) receiving an electronic query for data records, or an enumeration thereof, having data strings in one or more of the first data fields that fall within corresponding specified search subranges for those data fields; (b) in response to the query of part (a), with a computer processor programmed therefor and linked to the computer-readable medium, automatically electronically interrogating the first-level binary string segments to identify one or more first-level binary string segments that indicate one or more data records that have data strings within the specified search subranges queried in part (a); (c) in response to the query of part (a), with a computer processor programmed therefor, automatically electronically interrogating the one or more first-level binary string segments identified in part (b) to identify one or more data records indicated therein that have data strings within the one or more specified search subranges queried in part (a); and (d) generating a list or an enumeration of the one or more data records identified in part (c).

Data fields in the original dataset are selected for determining a suitable hierarchical arrangement for the data structure. In some instances, a suitable choice will be readily apparent, e.g., if the original dataset is arranged in a series of data tables arranged as a series of one-to-many relationships (as in FIG. 3). In other instances, several choices for a suitable hierarchy might be possible, and one might be selected on the basis of the nature of searches to be performed (e.g., choosing streets as the highest level nodes in the voter data example lends itself to geographic searching or filtering). In an exemplary sales dataset, organizing the dataset with customers as the highest-level nodes might facilitate searching and filtering based on customer-related data fields, while organizing the dataset with products as the highest-level nodes might facilitate searching or filtering based on product-related data fields. Once the hierarchy is selected and defined, data fields not assigned to clumps are assigned to corresponding levels in the hierarchy, and field masks are defined for each level of the hierarchy.

The "selecting," "defining," and similar steps are performed by suitably adapting the dataset conversion program to arrange the inline tree data structure in the desired way. That can be done by direct manual alteration of the conversion program, by indirect alteration of the conversion program using a suitably adapted graphical or text user interface, or by automated alteration of the conversion program based on an automated analysis of the original dataset.

With a suitably adapted conversion program, the original dataset typically is read from a computer-readable medium and processed to produce the corresponding inline tree data structure and its accompanying tables (e.g., string, supplementary, clump header). The conversion program works its way through the original, conventional data structure, e.g., to read the alphanumeric strings from the original data fields and store the corresponding binary indices in sequence in the inline tree, to determine which alphanumeric data fields are populated and store the corresponding field masks (if used) in sequence in the inline tree, or to determine to which clump a data record belongs and store the corresponding clump index in sequence in the inline tree. One or more binary data files embodying the inline tree data structure can be stored on any suitable computer-readable medium as it is generated or after it is generated. In many instances the binary data file is stored on a hard drive or other persistent storage medium, where it is ready to be loaded into RAM or other medium directly accessible to the computer processor the performs the search. In preparation for searching, the inline tree can be loaded into RAM in its entirety, as described above, where it can be accessed and retrieved into the processor's caches or registers as described above. The inline tree can be loaded into RAM "on demand" (i.e., in response to a search request) or preferably can reside in RAM in anticipation of one or more subsequent search requests.

One application of the inline tree data structure described herein is high-speed visualization of spatially linked data overlaid on a spatial diagram, e.g., geographically linked data overlaid on a map. As the map is panned across a viewing window, or as a user-defined polygon is manipulated on the map, the numbers of data records with geographic coordinates within the window or a polygon (both total and filtered according to any one or more desired data fields) are enumerated by searching the inline tree data structure for records having suitable geographic coordinates. In the registered voter example, the number of voters (total or filtered) is updated in near real time as the viewing window or polygon is manipulated (a fractional-second lag is observed when a few dozen simultaneous filters are employed). Each update of those numbers represents a complete reprocessing of the entire dataset (ca. 1.9 million different voter records) and enumeration of those data records that fall within the window or polygon and match the selected filter criteria; that speed is quite remarkable. Such speeds could never be reproduced using a conventional data structure in a typical computing environment. At best, a user would have to wait at least a few seconds up to nearly a minute for each update. Such spatial data visualization is just one example of a completely new use of the dataset that is enabled by the substantially increased search and filter speed, and represents a new and useful result provided by systems and methods disclosed or claimed herein.

An additional technique can be applied that can accelerate certain types of searching and filtering of the dataset, and includes recursive attribute subdivision. The term "recursive subdivision" as used herein shall denote the repeated subdivision of intervals within a range of a particular data field; in the present context, "recursive" does not refer to the computer programming technique commonly referred to as recursion. The recursive subdivision technique is suitable for attributes that include a range of values that can be readily subdivided into subranges and that can be readily correlated with other attributes of a data record. Recursive attribute subdivision is not necessarily applicable to every dataset. A two-dimensional example of recursive attribute subdivision is recursive spatial subdivision that can be applied to, e.g., the exemplary registered voter dataset (or to any other dataset that includes geo-location data). In the voter example, every address is (or can be) associated with a unique set of geographic coordinates (e.g., latitude and longitude). For example, every attribute clump (which in this example included address-related attributes) can be assigned subranges of geographic coordinates so that every address within the clump falls within the corresponding subranges.

One or more recursively divided attributes can serve as corresponding designated selection fields for the data records of the dataset, facilitating searching and filtering of the on the basis of those selection fields. In the voter dataset, geographic coordinates (or subranges thereof) of each street, address, or clump can serve as designated selection fields to facilitate searching and filtering based on geographic location.

Figure 8:
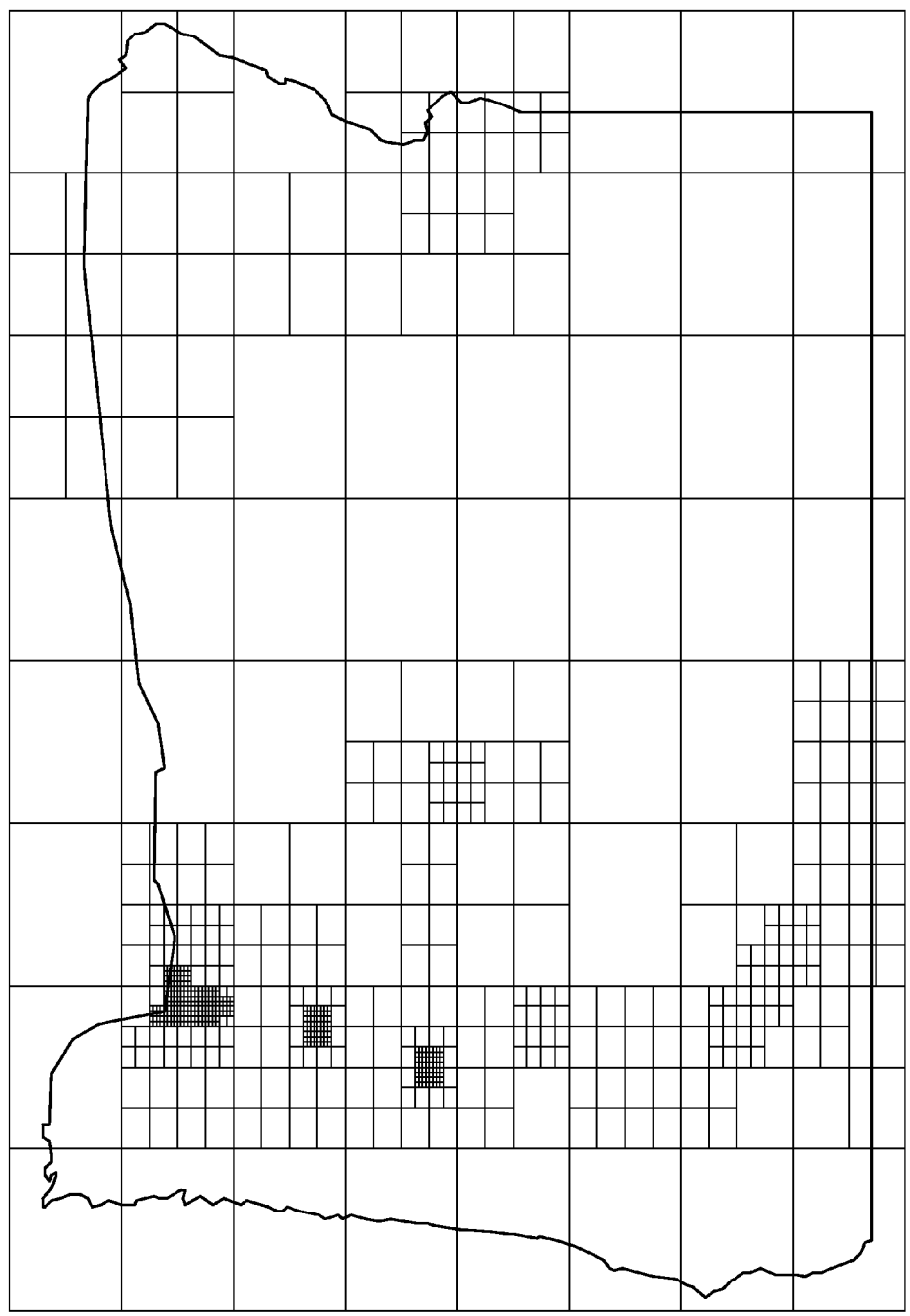
FIG. 8 illustrates schematically a set of selection rectangles superimposed on a map.

An example of recursive spatial subdivision is illustrated schematically in FIG. 8 for the registered voter dataset. A map of Oregon is shown recursively divided into quartered rectangles. In this example, the boundaries of each "rectangle" are lines of constant latitude or longitude on the approximately spherical surface of the earth, so each "rectangle" is actually the intersection of a spherical lune (bounded by lines of constant longitude) and a spherical zone (bounded by lines of constant latitude); the resulting area will nevertheless be referred to as a rectangle herein. Each rectangle can be specified by its latitude and longitude (e.g., beginning and end points, beginning points and ranges, center points and ranges); each voter record includes an address that is (or can be) associated with a latitude and longitude. Note that any other suitable system of spatial or geographic coordinates can be employed. During generation of the data structure, the number of voter addresses within each rectangle is determined and compared to a selected record limit (e.g., an absolute numerical limit of 1000 voters; in another example, a relative numerical limit of 1/1000 of the total number of voters; any suitable absolute or relative numerical limit can be employed, e.g., 200 voters or 500 voters). If the number of voter records with geographic coordinates within a given rectangle is greater than 1000 voters, then that rectangle is quartered and the process is repeated for the four resulting smaller rectangles. When a given rectangle is found to contain fewer than 1000 voters, there is no further subdivision of that rectangle; it is a so-called "terminal" rectangle. The result is a branched, multilevel "tree" of nested rectangles that cover the geographic area of interest, with smaller rectangles covering areas of higher population density and larger rectangles covering areas of lower population density. Each "leaf" of the recursively subdivided geographic "tree" corresponds to one of the undivided terminal rectangles on the map, each of which encompasses fewer than 1000 voters. Each of those terminal rectangles corresponds to subranges of latitude and longitude (i.e., selection field subranges). In FIG. 8, the rectangles shown illustrate this principle only qualitatively. To actually encompass less than 1000 voters each, the rectangles in even moderately densely populated areas would be much smaller than those shown, and would in fact appear as a mass of dots at the scale shown.

More generally, instead of a numerical record limit to terminate the recursive subdivision, some other criterion or combination of criteria can be employed. For example, in the registered voter example, the subdivision can be terminated when a rectangle encompasses less than a specified maximum number of addresses or streets, or when a minimum geographic area is reached. Any suitable criteria can be employed.

During further generation of the data structure, the subset of addresses on a given (physical) street that fall within a given terminal rectangle are considered as candidates to define a corresponding "street" (more accurately, a street segment; a "street" is an example of a first-level subset of data records within the voter dataset). If data clumping has been employed, and if addresses on the candidate street fall within different clumps, the candidate street can be further divided into segments having addresses falling within only one data clump. A "street" in this example dataset is therefore a subset of addresses on a given physical street that (i) fall within the same one of the geographic terminal rectangles, and (ii) fall within the same data clump.

A binary selection header string can be included in a binary inline tree data file or as a separate file. Such a header can comprise a binary tree representing the corresponding selection field subranges, in a manner that reflects the recursively subdivided "tree" structure described above (e.g., a selection field subrange of a given rectangle can be linked in the list to selection field subrange of one of its sub-rectangles). Each terminal record in the linked list (i.e., each "leaf" of the recursively subdivided "tree") corresponds to one of the terminal rectangles, and can indicate a location within the inline tree data structure of a first-level header of a corresponding first-level binary string. In the more concrete example of the voter dataset, the binary selection header comprises a linked list of latitude and longitude subranges (or subranges of other suitable geographic coordinates for the recursively subdivided areas). Each terminal record in the linked list (designating one of the undivided, terminal rectangles) indicates the location of one of the street-level binary headers in the inline tree data structure. The subset comprising streets that fall within a given terminal rectangle can be arranged in the binary data file as a binary tree representing first-level binary street segments that fall within that rectangle. The terminal record of the linked list of those streets can indicate the next record in the linked list of latitude/longitude subranges. That pattern can be repeated until all rectangles and streets segments are linked.

The structure described in the foregoing paragraph can enable extremely efficient searching and filtering based on geographic location. The search program can be adapted to first search the linked list of latitude/longitude or other geographic subranges and compare those to a user-selected viewing window or polygon on a map. Any rectangles that do not overlap the window or polygon can be skipped over without searching or filtering any of the corresponding street, address, or voter fields. The recursively subdivided tree structure can be thought of as guiding the search and filter processes to those portions of the inline tree data structure where pertinent data records are to be found.

The inline tree data structure and recursive subdivision based on spatial coordinates can enable near-real-time visualization or manipulation of extremely large datasets overlaid on a spatial diagram (e.g., >$10^6$ voter data records overlaid on a map). That new and useful result can be applied to a virtually endless variety of spatially linked data, such a geographically linked data. Just a few of myriad examples include data pertaining to voters, populations, demographics, economics, taxation, government administration, law enforcement, education, political polling, political campaigns, elections, media distribution or consumption (print, radio, video, Internet), telecommunications, real estate, insurance, transportation and shipping (land, sea, or air), fleet management (autos, trucks, buses, trains, transit vehicles, boats or ships, aircraft, and so on), product or material marketing, sales, or distribution (wholesale or retail), manufacturing, supply chains, raw materials (water, forests, mineral deposits, fossil fuel deposits), agriculture, medical or epidemiologic data, wildlife monitoring or management, astronomical data (e.g., using lunar, planetary, or galactic latitude and longitude), power generation or transmission, manmade or natural disasters, disaster response or logistics, and so on.

Other types of datasets can be arranged according to recursively divided subranges of data strings in one or more designated selection fields. Such arrangements can enable rapid searching and filtering of data records having attributes falling within designated selection field subranges. Any recursive subdivision of data field subranges of any desired dimensionality using any suitable set of one or more chosen selection fields shall fall within the scope of the present disclosure or appended claims. For example, in a dataset pertaining to people and organized by last name, recursive subdivision based on letters in each name can be employed, with varying numbers of letters defining each recursively divided subrange as needed. It should be noted that recursive subdivision of designated selection field subranges can be implemented to facilitate searching of data structures other than the inline tree data structure of FIG. 4. In particular, such recursive subdivision can be employed (alone or in combination with other techniques, including size-reducing techniques disclosed herein) to guide searching and filtering of an inline tree data structure that is not necessarily arranged according to a hierarchical tree organization scheme, or to guide searching and filtering of a conventional flat file or relational database, or other data structure.

The generic inline tree data structure of FIG. 4 with binary strings arranged as in FIG. 7 (i.e., as disclosed in the '063 applications) can be searched and filtered according to any desired combination of data fields. That flexibility demands that for each binary string Ax, Bxy, or Cxyz, a field mask is examined to determine whether that binary string includes data for the selected filter fields. It has been observed that at the search speeds achievable using the inline tree structure of FIG. 7 (i.e., about 250-400 nanoseconds per data record), the time required for a computer processor to make those decisions becomes a significant fraction of the overall time required (e.g., estimated at about 3 to 10 nanoseconds per bit examined in the field mask). In most instances, only a small subset of the data fields are of interest as filter criteria. For example, in a filtered search of the voter dataset, it might be desired to filter based on only location, gender, age, and party affiliation. In that example, the time spent determining which bytes of the binary string represent the data fields of interest is wasted. Repeated for every data record, that wasted time can become significant.

In an inline tree data structure arranged according to the present disclosure or appended claims (e.g., with binary strings arranged as in FIG. 9), before the inline tree is generated, certain data fields are selected to be made available as possible search filter criteria, and only those fields are represented by corresponding binary indices in the binary strings of the inline tree data structure. Instead of using a field mask, all binary strings include all of the selected filter criteria fields, so that all of the binary strings at each level present in the hierarchy are the same length (i.e., all of the Ax binary strings are the same length, all of the Bxy binary strings are the same length, all of the Cxyz binary strings are the same length, and so on). Each of the binary strings (except for the lowest level binary strings, which include one so-called "sentinel" index, as explained below), include only the corresponding selected filter criteria data fields (or no fields at all, if it happens that no fields at a particular level of the hierarchy are made available for filtering). In the voter example of the previous paragraph, the binary strings would include data fields for only location, gender, age, and party affiliation. There can be null fields in the inline tree structure, which would typically be considered undesirable (as discussed above). However, in many instances at most one or two dozen or so data fields (or even just a handful) are selected as available filter fields (out of more than, e.g., 100+ fields per address and 20+ fields per voter in the voter dataset). Also, it is often but not necessarily the case that those fields selected for filtering are less likely to be empty in any given data record. The size reduction of the inline tree that results from excluding a substantial fraction of the data fields from the inline tree is much larger than space taken up by null fields within the inline tree. In one example using the voter database, the size of the inline tree can be reduced from about 160 MB (for the inline tree arranged according to the '063 applications that includes about 100 fields per record, about 90 of which are clumped) to about 40-50 MB (for an inline tree arranged according to the present disclosure or appended claims that includes about 100 fields per record, about 90 of which are clumped and the remainder of which are filterable).

In another example, U.S. census data representing over 270 million people can be divided into about 65,000 clumps (state, county, census tract), about 5 million geographic points, and about 114 million records (including age, gender, ethnicity). Arranging that data into an inline tree structure as shown in FIG. 9 results in a structure well below about 1 gigabyte in size.

FIG. 9 illustrates schematically details of exemplary binary strings Ax, Bxy, and Cxyz of an inline tree data structure arranged according to the present disclosure or appended claims (and shown generically in FIG. 4). To generate such an inline tree data structure, the data fields (i.e., data attributes) of the dataset are divided into three categories before generating the inline tree. The first category of data attributes are those that are selected for attribute clumping, as described above. Such attribute clumping leads to significant size reduction of the inline tree data structure, and also readily enables a search of the dataset filtered according to any combination of those clumped attributes. For any combination of filter criteria within the clumped attributes, each clump is checked against the selected filter criteria. If a given clump does not match the selected criteria, it can be skipped entirely without further searching. Due to the relatively small number of clumps (e.g., about 7000 clumps for the voter dataset of about 1.9 million voter records; about 65,000 clumps for the U.S. census data of about 270 million people), conventional storage and searching of the clump table (can also be referred to as a "clump header file") can be employed while still enjoying the speed gains enabled by searching the inline tree data structure.

Of the remaining data attributes (i.e., the "non-clumped" attributes), a second category comprises a subset of those attributes for which search filtering will be made available to an end user of the dataset. Those selected fields or attributes can be designated as "non-clumped, filterable," and only those data fields are incorporated into the inline tree data structure of FIG. 9 (typically using string indexing, as described above). The third category comprises all remaining attributes, which can be designated as "non-clumped, non-filterable." Those can be stored in any suitable or conventional fashion, and need not be as readily available for searching or filtering. The "non-clumped, non-filterable" field values typically would only be accessed if a listing of search results were desired (instead of an enumeration only); such a listing of data records is inherently slow and does not necessarily benefit from the inline tree data structure in any case. If desired, however, the "non-clumped, non-filterable" fields can be stored in an inline tree structure for convenience or for consistency with storage of the filterable non-clumped fields.

The further reduction in size of the inline tree data structure of FIG. 9, relative to that of FIG. 7, magnifies the advantages discussed above. The entire inline tree data structure can be loaded into an even smaller amount of RAM on a smaller or less powerful computer, or even larger datasets (e.g., on the order of $10^7$, $10^8$, or more data records, such as U.S. census data) can be loaded into a given amount of RAM on a larger computer or server. Each 16- or 64-bit segment of data loaded into cache or registers represents a larger fraction of the total data, so the number of separate read steps (i.e., the slow steps) is significantly reduced relative to the number of records that are examined.

The inline tree data structure of FIG. 9 provides further advantages beyond mere size reduction. As indicated above, each decision made by the processor may require several nanoseconds; reducing the number of such decisions can reduce the time required to process the inline tree. Such a reduction might not be noticeable in conventional searching of a conventional data structure, because the read steps are by far slower and account for the bulk of the search time. Once those read steps are reduced, the time required for processor decision steps becomes relatively more significant and noticeable.

As noted above, the conversion from a conventional data structure to the inline tree data structure of FIGS. 4 and 7 sacrifices flexibility and editability for search and filter speed. An alteration of the data generally requires generation of a new inline tree data structure. In addition, the evolution from the inline tree data structure of FIGS. 4 and 7 to one arranged according to FIGS. 4 and 9 achieves further size reductions and speed gains, by sacrificing flexibility in choosing filter criteria for searching. Any combination of filter criteria can be applied to the inline tree structure of FIG. 7, because all data fields are represented in the clump table or in the inline tree. In contrast, non-clumped data fields that are not selected to be available for filtering are omitted from the inline tree structure; they are essentially "invisible" to search and filter programs described below. Using such a program, a user can choose among the clumped or selected data fields for filtering a search, but cannot choose to filter on a field that is not included in a clump or in the inline tree structure. To enable filtering on such a non-selected data field, new clumps or new selections must be made, and a new clump table generated or a new inline tree data structure generated, to make a previously non-clumped, non-filterable data field available for filtering (either as part of a clump or as part of the inline tree). It should be noted that, in some instances, filtering based on data fields that are not represented in the inline tree data structure can be performed in conjunction with searching and filtering the inline tree itself. Such hybrid searching and filtering can impose a significant speed penalty (due to the need to repeated access an additional data structure).

In the course of processing the inline tree data structure of FIG. 7, each bit of each field mask is examined to determine how a subsequent sequence of bytes is to be interpreted, resulting in a large number of decisions made by the processor (at least on the order of the number of lowest-level data fields per data record; e.g., 25+ fields per voter times 1.9 million voters in the voter dataset). In contrast, in the course of processing the inline tree data structure of FIG. 9, only one decision must be made per data record to determine how a subsequent sequence of bytes is to be interpreted, because all of the binary strings at a given level of the data hierarchy (e.g., all of the Ax strings, all of the Bxy strings, or all of the Cxyz strings) are the same length and contain the same fields. In a typical example, every Ax binary string is always followed by a Bxy binary string; every Bxy binary string is always followed by a Cxyz binary string. Each Cxyz binary string in the inline tree is followed by another Cxyz binary string, by a Bxy binary string, by an Ax binary string (from the same clump or from a different clump, if needed or desired; explained further below), or by no string (i.e., at the end of the tree). The Ax and Bxy binary strings include only the corresponding data fields selected to be available for filtering (if any). In addition to those data fields selected to be available for filtering, each lowest level binary string (e.g., the Cxyz binary strings) also includes a so-called "sentinel" index (i.e., a process control field) that indicates the nature of the next binary string, or that the Cxyz binary string is at the end of a clump or at the end of the inline tree. The sentinel index can be any necessary or desired size to accommodate the number of possibilities for the nature of the next binary string. In the preceding example there are up to 5 possibilities, requiring at least a 3-bit index; a 1-byte index or any other needed or desired index size can be employed for the sentinel index to indicate any needed or desired number of possibilities for how the succeeding sequence of bytes is to be interpreted. The sentinel index can occupy any desired location within the corresponding Cxyz binary string.

The corresponding customized search or filter process used to process the inline tree of FIG. 9 traverses the inline tree and examines certain fields present in each binary string to determine whether they fall within selected filter criteria. The data fields to be examined are chosen by a user from among those made available for filtering by their inclusion in the inline tree data structure of FIG. 9. Filter criteria for those chosen fields are also selected by the user, can be of differing types depending on the nature of corresponding data field, and can include yes/no criteria (e.g., sex), multiple choice criteria (e.g., ethnicity), or range criteria (e.g., age). The only decisions typically required of the processor for navigating and interpreting the inline tree are the determinations of the type of binary string that follows the current one, as indicated by the sentinel fields included in the lowest level binary strings. An example of a search and filter process performed on the inline tree data structure of FIG. 9 is illustrated by the flow chart of FIG. 10A.

After the user chooses which fields are to be searched (among those clumped or represented in the inline tree), and what criteria are to be applied to those fields, the main search and filter process begins. The clump header table (e.g., as shown in FIG. 5C) is accessed as each clump is evaluated; if all clumped filter criteria are satisfied for a given clump, the search/filter program, guided by a pointer in a corresponding clump data record of the clump header table, accesses the inline tree structure of FIG. 9 to process the corresponding binary strings (Ax, Bxy, and Cxyz binary strings in this three-level example). A running list or enumeration of data records meeting the chosen filter criteria is maintained during the search and filter process. At each level of the hierarchy, the program determines which of those fields present in the inline tree were chosen for filtering and evaluates those fields; if the filter criteria are satisfied, the program moves down to the next level, or if not, the program moves to the next binary string at the same level. Once the binary strings of a given clump are processed, the program returns to the clump header table to evaluate the next clump. The processing is repeated until the entire data set (or a pre-filtered portion thereof) has been processed. Pre-filtering can include, e.g., restricting the search and filter program to processing only a subset of the data clumps based on any suitable criterion.

Figure 10A:
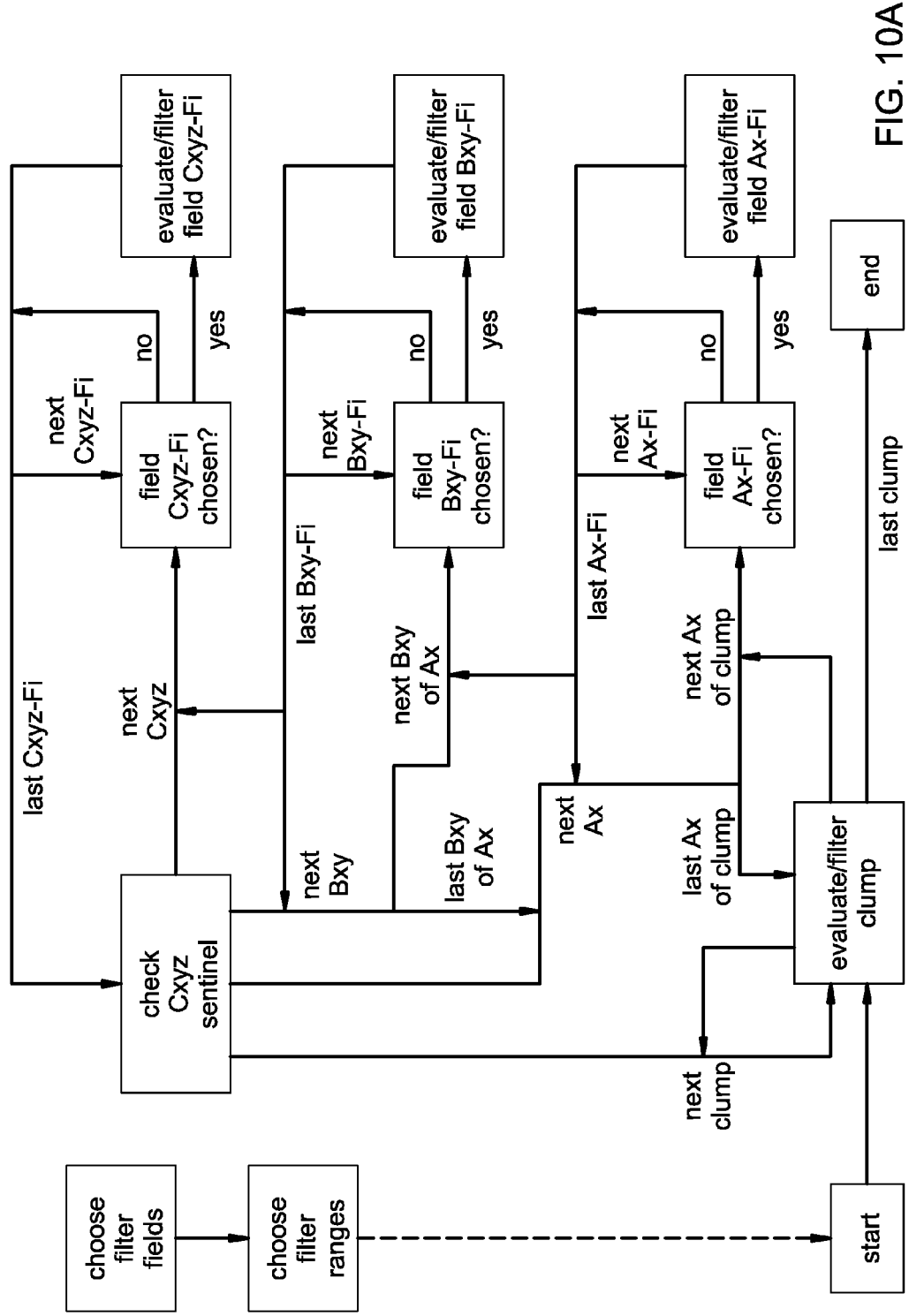
FIGS. 10A and 10B are flow charts of exemplary search and filter processes performed on data fields arranged as shown in FIG. 9.
Figure 10B:
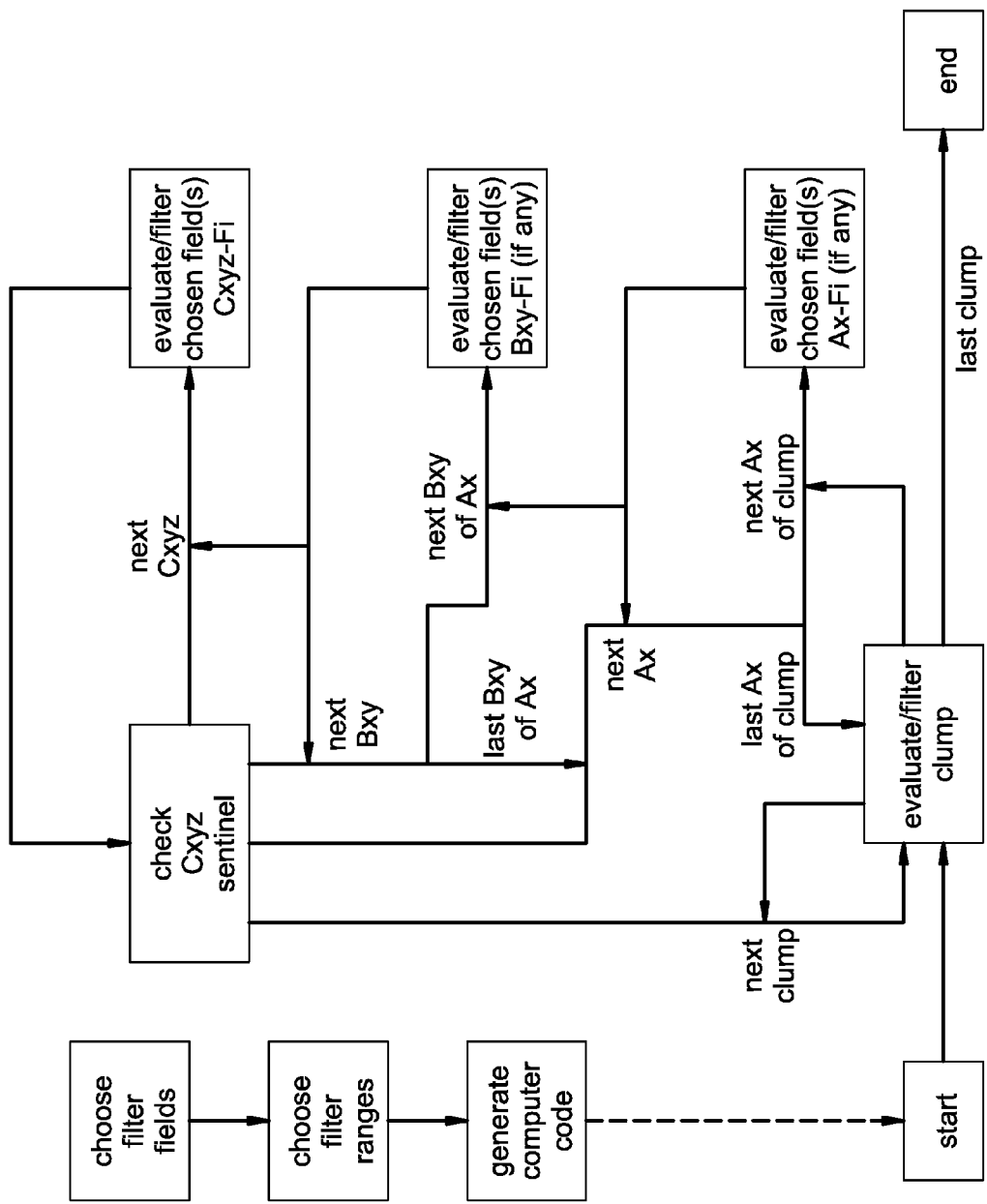

It should be emphasized that the data fields described as "available for filtering" in the preceding include those non-clumped fields that were selected for inclusion in the inline tree structure of FIG. 9 as well as all clumped data fields (represented in the examples of FIGS. 10A and 10B by the "check clump" steps). Filtering based on clumped attributes can occur within the inline tree structure of FIG. 9 (e.g., by including a clump ID field in the inline tree data structure). However, it may be more advantageous for filtering of clumped attributes to occur outside the inline tree structure of FIG. 9. As noted above, for any combination of filter criteria within the clumped attributes, each clump record in the separate clump header table is checked against the selected filter criteria. If a given clump does not match the selected criteria, it can be skipped entirely without further searching of the corresponding portions of the inline tree. Due to the relatively small number of clumps (e.g., about 7000 clumps for the voter dataset of about 1.9 million voter records; about 65,000 clumps for the U.S. census data set of about 270 million people), conventional storage and searching of the clump header table can be employed while still enjoying the speed gains enabled by searching the inline tree data structure for non-clumped filtered data fields. Such a clump header table can, in some examples, take the place of the recursive subdivision described above. In such an example, each "end of clump" sentinel can include a pointer from the inline tree data structure to the next record of the clump header table. In such an example, a search and filter process would bounce back and forth between the clump header table and the inline tree structure as needed.

The computer program used to search and filter the clump header table and the inline tree data structure typically is generated or modified in accordance with the generation of those data objects. For example, the computer code can be programmed to "know" the number, size, and type of the data fields that appear in the inline tree data structure, and which data fields are clumped. The program can employ process control fields in the lowest-level binary strings as a guide to how to process the next strings (e.g., Cxyz followed by another Cxyz, by Bx,y+1, by Ax+1 within the same clump, or Ax+1 in the next clump). If higher level fields do not match the corresponding filter criteria, the program can guide the search through the corresponding lower level binary strings without evaluating or filtering them (e.g., using the process control fields), or can read location offsets in the inline tree that indicate the location of the next binary string of the same level (e.g., an Ax binary string can include an offset indicating the location of Ax+1, so that the intervening Bxy and Cxyz binary strings can be skipped over if the Ax fields do not satisfy the filter criteria). In some instances, one or more search criteria can be chosen implicitly by the user (e.g., ranges for latitude and longitude fields can be chosen by panning a viewing window over a map); in other instances such ranges are chosen explicitly (e.g., by checking a box next to "50-59" in list of age ranges). In various examples, a new search and filter operation can be initiated (i) after choosing all new filter fields and all new filter ranges, (ii) without choosing new filter fields but altering the filter ranges, or (iii) after choosing some arbitrary combination of new filter fields (among those available for filtering) or new filter ranges.

Further reduction of processor decision-making can be achieved by run-time generation (e.g., by compiling or interpreting) of portions of the computer code for the search and filter process. In a pre-compiled computer code, an arbitrary combination of one or more clumped or filterable fields can be selected for filtering a search. When such a program is executed (as in FIG. 10A), a decision typically needs to be made for every filterable field in the inline tree as to whether that field should be evaluated and filtered. If the answer is "yes," then additional time is required to read the field, determine the nature of the criterion (e.g., yes/no, multiple choice, or numerical range), compare its contents to the selected filter criterion, and decide whether the field value satisfies the criterion. However, even if the answer is "no" for a given field (i.e., although available for filtering, it was not chosen as a filter for a particular search), the processor still must take the time to make that decision for each data field of each record.

In an alternative search and filter process according to the present disclosure or appended claims, the portion of the computer code that corresponds to that decision-making can be generated only after selection by a user of specific filter fields among those available for filtering. That code generation can be performed so as to remove unnecessary decision points from the search and filter process, resulting in further time savings. In a concrete example, suppose ten fields are selected as available for filtering and incorporated into the inline tree structure of FIG. 9, and then suppose a user chooses to filter search results based on fields 2, 4, and 7. Using pre-compiled computer code, for each record in the inline tree the search and filter program might need to decide ten times whether to interrogate a data field, and three times the answer will be "yes" and the field will be evaluated and filtered. Using a search and filter program according to the present disclosure or appended claims, before the search is performed a portion of its code is generated so as to instruct the processor to jump to and evaluate only fields 2, 4, and 7; the other fields are skipped entirely, and no decisions are required of the processor to enable that skipping. As with other techniques disclosed herein, the time savings may be on the order of only a few nanoseconds per record per data field, but that amount of time becomes significant once other time and size reduction measures have been taken, as described elsewhere herein, and can add up rapidly for a large dataset ($>10^6$, $10^7$, $10^8$, or more data records).

Further speed gains can be realized by "run-time" generation of computer code by encoding the nature of the search criterion into the code, e.g., the code can be structured to reflect whether the criterion is a yes/no type, multiple choice type, or numerical range type. Removal of that determination as an executed decision point, again, can save a few nanoseconds for each filtering of a data field. Such time savings may be negligible when processing $10^4$ data records, but can become significant when processing $10^8$ data records.

An example of a search and filter process that has been generated run time to reduce processor decision-making is illustrated by the flow chart of FIG. 10B. Each box and branch point "missing" from FIG. 10B (relative to FIG. 10A) represents a decision point in the program of FIG. 10A that has been eliminated by integrating the outcomes of those decisions into the structure of the generated computer code represented by FIG. 10B. In addition, each "evaluate/filter" operation of FIG. 10A typically includes a determination of the nature of the corresponding filter criterion; each such determination can be eliminated from the analogous "evaluate/filter" operation of FIG. 10B by integrating it into the code generated at run-time. The foregoing example is illustrative only; a search and filter program can be accelerated by such removal of decision points regardless of its specific arrangement (e.g., sequential decisions as each field is encountered, as described above and illustrated in FIG. 10A; repeatedly accessing discrete data entries that indicate which fields are to be filtered; and so on). Any suitable compiler, interpreter, or other programming tools or techniques can be employed for such "run-time" generation or adaptation of the search and filter computer code, as described above.

In various examples, a new search and filter operation can be initiated (i) after choosing all new filter fields and all new filter ranges and generating the corresponding computer code, (ii) without choosing new filter fields but altering the filter ranges, with or without generating new computer code (as needed or desired), or (iii) after choosing some arbitrary combination of new filter fields (among those available for filtering) or new filter ranges, with or without generating new computer code (as needed or desired).

It should be noted that "run-time" generation or adaptation of computer code, as described above, can be employed for searching or filtering data structures other than inline tree data structures disclosed or claimed herein or exemplified in FIG. 4, 7, or 9. In particular, such "run-time" code generation or adaptation can also be employed (alone or in combination with other techniques, including those disclosed herein) to reduce the time required to execute a search and filter process of (i) an inline data structure that is not necessarily arranged according to a hierarchical tree organization scheme, (ii) a conventional flat file or relational database, or (iii) a data structure of some other type.

The result or output of a given search and filter process is a list or (more typically) an enumeration of those data records in the dataset that satisfy the specified search and filter criteria (e.g., Republican men aged 50-59 in Lane County, Oreg.). Such output can be employed in a variety of ways depending on the nature of the data being processed (see examples given above); for example, the output can be used to analyze population or demographic totals or trends. The list or enumeration can be provided as text or numerical data, or can be used to generate a graphical representation, such as a graph or chart. In one embodiment, an image or animation can be generated with the graphical representation of the list or enumeration overlaid on a map. The extreme speed of the search and filter processes disclosed or claimed herein can enable near-real-time filtered visualization of extremely large sets of spatially linked data on a spatial diagram (e.g., geographically linked data visualized on a map), which in turn enables whole new possibilities for studying, analyzing, understanding, or predicting a virtually endless array of spatially linked data (including the examples given above). Any suitable process or technique can be employed to generate the graphical representation, image, or animation, or to overlay those on a map, spatial diagram, or other underlying image. Methods disclosed or claimed herein can be advantageously employed in conjunction with digital maps provided by third-parties (e.g., Google Maps®, Bing Maps®, or Google Earth®; graphical representations of search and filter results can be overlaid on maps provided by those third parties.

The systems and methods disclosed herein can be implemented as or with general or special purpose computers or servers or other programmable hardware devices programmed through software, or as hardware or equipment "programmed" through hard wiring, or a combination of the two. A "computer" or "server" can comprise a single machine or can comprise multiple interacting machines (located at a single location or at multiple remote locations). Computer programs or other software code, if used, can be implemented in temporary or permanent storage or in replaceable media, such as by including programming in microcode, machine code, network-based or web-based or distributed software modules that operate together, RAM, ROM, CD-ROM, CD-R, CD-R/W, DVD-ROM, DVD±R, DVD±R/W, hard drives, thumb drives, flash memory, optical media, magnetic media, semiconductor media, or any future storage alternatives. One or more binary data files embodying the inline tree data structure can also be stored on any suitable computer-readable medium, including those listed above, but as disclosed herein the inline tree data structure is preferably loaded entirely into a computer-readable medium that is directly accessible to a computer processor executing a search of the data structure, e.g., a computer random access memory (RAM).

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

In the foregoing Detailed Description, various features may be grouped together in several exemplary embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed exemplary embodiment. Thus, the appended claims are hereby incorporated into the Detailed Description, with each claim standing on its own as a separate disclosed embodiment. However, the present disclosure shall also be construed as implicitly disclosing any embodiment having any suitable set of disclosed or claimed features (i.e., sets of features that are not incompatible or mutually exclusive) that appear in the present disclosure or the appended claims, including those combinations of features that may not be explicitly disclosed herein. It should be further noted that the scope of the appended claims do not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof, wherever they appear, shall be construed as open ended terminology, with the same meaning as if the phrase "at least" were appended after each instance thereof.

In the appended claims, if the provisions of 35 USC §112 ¶ 6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶ 6 are not intended to be invoked for that claim.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A computer-implemented method comprising:
receiving from a computer-readable storage medium first electronic indicia of a dataset comprising a multitude of alphanumeric data records, each data record including data strings for multiple corresponding defined data fields; and
using one or more computer processors programmed therefor and operatively coupled to the first storage medium, generating second electronic indicia of the data set comprising (i) an alphanumeric or binary clump header table comprising a plurality of clump data records and (ii) an inline tree data structure; and
storing the inline tree data structure and the clump header table on a computer-readable storage medium operatively coupled to the one or more computer processors, wherein:
for a first set of one or more data fields among the defined data fields, each range of data strings for the first set of data fields is divided into multiple corresponding subranges, and the multitude of data records comprises multiple first-level subsets of the data records, wherein each first-level subset includes only those data records for which each data string of the first set of data fields falls within a corresponding one of the subranges;
for a second set of one or more data fields among the defined data fields, each range of data strings for the second set of data fields is divided into multiple corresponding subranges, and each one of the multiple first-level subsets of the data records comprises multiple corresponding second-level subsets of the data records, wherein each second-level subset includes only those data records for which each data string of the second set of data fields falls within a corresponding one of the subranges;
the inline tree data structure comprises an alternating sequence of (i) multiple first-level binary string segments, each followed by (ii) a subset of one or more corresponding second-level binary string segments;
each first-level binary string segment encodes the range of data strings in a selected filterable subset of the first set of data fields of a corresponding one of the first-level subsets of the data records, and excludes a non-filterable subset of the first set of data fields;
each second-level binary string segment encodes the range of data strings in a selected filterable subset of the second set of data fields of a corresponding one of the second-level subsets of the data records, and excludes a non-filterable subset of the second set of data fields;
for a selected subset of the defined data fields, each combination of specific data strings that occurs in the dataset is indicated by a corresponding one of the plurality of clump data records of the clump header table; and
each clump data record in the clump header table includes an indicator of a location in the inline tree data structure of a corresponding first-level binary string segment.

2. The method of claim 1 wherein:
for a third set of data field among the defined data fields, each range of data strings for the third set of data fields is divided into multiple corresponding subranges, and each one of the multiple second-level subsets of the data records comprises multiple corresponding third-level subsets of the data records, wherein each third-level subset includes only those data records for which the data string of the third data field falls within a corresponding one of the subranges; and
the inline tree data structure further comprises a subset of one or more corresponding third-level binary string segments following each second-level binary string segment; and
each third-level binary string segment encodes the range of data strings in the third set of data fields of a corresponding one of the third-level subsets of the data records.

3. The method of claim 2 wherein each second-level binary string segment and one or more corresponding third-level binary string segments form a substantially contiguous portion within the inline tree data structure.

4. The method of claim 2 wherein each lowest-level binary string segment includes a process control field that indicates that the next binary string segment of the inline tree data structure is (i) at the same level, (ii) one level higher, (iii) two levels higher, or (iv) at a higher level that corresponds to a different data clump record.

5. The method of claim 2 wherein each of the first- or second-level binary string segments includes an indicator of (i) a length of the corresponding binary string segment, (ii) a location of a next binary string segment of the same level, or (iii) a location of a last lowest-level binary string that follows the corresponding binary string segment.

6. The method of claim 1 wherein each first-level binary string segment and one or more corresponding second-level binary string segments form a substantially contiguous portion within the inline tree data structure.

7. The method of claim 1 wherein each lowest-level binary string segment includes a process control field that indicates that the next binary string segment of the inline tree data structure is (i) at the same level, (ii) one level higher, (iii) two levels higher, or (iv) at a higher level that corresponds to a different data clump record.

8. The method of claim 1 wherein each of the first- or second-level binary string segments includes an indicator of (i) a length of the corresponding binary string segment, (ii) a location of a next binary string segment of the same level, or (iii) a location of a last lowest-level binary string that follows the corresponding binary string segment.

9. The method of claim 1 wherein (i) the dataset comprises a set of data records that each include geographic coordinates, and (ii) the selected subset of the defined data fields are linked to the geographic coordinates.

10. The method of claim 9 wherein the dataset comprises a multitude of voter registration records.

11. The method of claim 9 wherein the dataset comprises a multitude of census data records.

12. A computer-implemented method for searching or filtering an inline tree data structure and a clump header table stored on a computer-readable medium, wherein:
   the clump header table and the inline tree data structure comprise at least a portion of electronic indicia generated from a dataset comprising a multitude of alphanumeric data records, each data record including data strings for multiple corresponding defined data fields;
   for a first set of one or more data fields among the defined data fields, each range of data strings for the first set of data fields is divided into multiple corresponding subranges, and the multitude of data records comprises multiple first-level subsets of the data records, wherein each first-level subset includes only those data records for which each data string of the first set of data fields falls within a corresponding one of the subranges;
   for a second set of one or more data fields among the defined data fields, each range of data strings for the second set of data fields is divided into multiple corresponding subranges, and each one of the multiple first-level subsets of the data records comprises multiple corresponding second-level subsets of the data records, wherein each second-level subset includes only those data records for which each data string of the second set of data fields falls within a corresponding one of the subranges;
   the inline tree data structure comprises an alternating sequence of (i) multiple first-level binary string segments, each followed by (ii) a subset of one or more corresponding second-level binary string segments;
   each first-level binary string segment encodes the range of data strings in a selected filterable subset of the first set of data fields of a corresponding one of the first-level subsets of the data records, and excludes a non-filterable subset of the first set of data fields;
   each second-level binary string segment encodes the range of data strings in a selected filterable subset of the second set of data fields of a corresponding one of the second-level subsets of the data records, and excludes a non-filterable subset of the second set of data fields;
   for a selected subset of the defined data fields, each combination of specific data strings that occurs in the dataset is indicated by a corresponding one of the plurality of clump data records of the clump header table; and
   each clump data record in the clump header table includes an indicator of a location in the inline tree data structure of a corresponding first-level binary string segment,
   wherein the method comprises:
   (a) receiving an electronic query for data records, or an enumeration thereof, having data strings in one or more specified clumped or filterable data fields that fall within corresponding specified filter subranges for those data fields;
   (b) in response to the query of part (a), with a computer processor programmed therefor and linked to the computer-readable medium, automatically electronically interrogating the clump header table to identify one or more clump data records that correspond to data strings in specified clump data fields that fall within the specified filter subranges according to the query of part (a);
   (c) automatically electronically interrogating, with a computer processor programmed therefor and linked to the computer-readable medium, those first-level binary string segments indicated by the clump data records identified in part (b), to identify one or more first-level binary string segments that indicate one or more data records that have data strings in specified filterable data fields within the specified filter subranges according to the query of in part (a);
   (d) automatically electronically interrogating, with a computer processor programmed therefor and linked to the computer-readable medium, those second-level binary string segments corresponding to the first-level binary string segments identified in part (c), to identify one or more second-level binary string segments that indicate one or more data records in specified filterable data fields that have data strings within the specified filter subranges according to the query of part (a); and
   (e) automatically generating, with a computer processor programmed therefor, and storing, on a computer-readable medium coupled to that processor, a list or an enumeration of one or more data records that correspond to the clump data records identified in part (b), the first-level binary strings segments identified in part (c), or the second-level binary strings identified in part (d).

13. The method of claim 12 wherein the inline tree data structure is stored in one or more computer-readable media that are directly accessible to the computer processor of part (c) or (d).

14. The method of claim 13 wherein the directly accessible computer media include random access memory.

15. The method of claim 13 further comprising loading sequentially, according to location within the inline tree data structure, the binary string segments into a processor cache computer memory.

16. The method of claim 12 wherein the clump header table is stored in a computer-readable medium that is directly accessible to the computer processor of part (b).

17. The method of claim 12 further comprising, in response to the query of part (a), with a computer processor programmed therefor and linked to the computer-readable medium, automatically electronically generating computer code for performing parts (c) and (d).

18. The method of claim 17, wherein the generated computer code causes binary string segments corresponding to non-specified filterable data fields to be skipped over without requiring a processor decision in parts (c) and (d).

19. The method of claim 17 wherein the generated computer code encodes one or more of the corresponding filter subranges specified in the query of part (a).

20. The method of claim 12 wherein the interrogation of part (c) or (d) includes evaluating a corresponding process control field of the interrogated binary string segment to determine that the next binary string segment of the inline tree data structure is (i) at the same level, (ii) one level higher, (iii) two levels higher, or (iv) at a higher level that corresponds to a different data clump record.

21. The method of claim 12 wherein the one or more binary data files indicate at least 1,000,000 data records, and the interrogations of parts (a), (b), and (c) are performed in less than 150 nanoseconds per data record per processor core.

22. The method of claim 12 wherein the one or more binary data files indicate at least 10,000,000 data records, and the interrogations of parts (b) and (c) are performed in less than 150 nanoseconds per data record per processor core.

23. The method of claim 12 wherein one or more computer-readable media directly accessible to the computer processor of part (c) or (d) are encoded to store the inline tree data structure.

24. The method of claim 23 wherein one or more of the computer-readable media comprise random access memory.

25. The method of claim 23 further comprising loading sequentially, according to location within the inline tree data structure, the binary string segments into a processor cache computer memory.

26. The method of claim 12 wherein (i) the dataset comprises a set of data records that each include geographic coordinates, and (ii) the selected subset of the defined data fields are linked to the geographic coordinates.

27. The method of claim 26 wherein the dataset comprises a multitude of voter registration records.

28. The method of claim 26 wherein the dataset comprises a multitude of census data records.

29. The method of claim 26 further comprising:
generating a graphical representation of the list or enumeration generated in part (e); and
generating an image or animation of the graphical representation overlaid on a map.

30. The method of claim 29 wherein the dataset comprises a multitude of voter registration records.

31. The method of claim 29 wherein the dataset comprises a multitude of census data records.

* * * * *

UNITED STATES PATENT AND TRADEMARK OFFICE
CERTIFICATE OF CORRECTION

| | | |
|---|---|---|
| PATENT NO. | : 8,977,656 B2 | Page 1 of 1 |
| APPLICATION NO. | : 13/347646 | |
| DATED | : March 10, 2015 | |
| INVENTOR(S) | : Ward | |

It is certified that error appears in the above-identified patent and that said Letters Patent is hereby corrected as shown below:

IN THE CLAIMS:

Column 30, line 34 (Claim 2): replace "of data field" with --of data fields--

Column 30, line 41 (Claim 2): replace "data field" with --data fields--

Column 32, line 41 (Claim 12): replace "strings segments" with --string segments--

Signed and Sealed this
Fourteenth Day of July, 2015

Michelle K. Lee
*Director of the United States Patent and Trademark Office*